United States Patent
Xie et al.

(10) Patent No.: US 11,848,858 B2
(45) Date of Patent: Dec. 19, 2023

(54) BIER FORWARDING ENTRY CONSTRUCTION METHOD, APPARATUS, AND SYSTEM

(71) Applicant: HUAWEI TECHNOLOGIES CO., LTD., Shenzhen (CN)

(72) Inventors: Jingrong Xie, Beijing (CN); Naiwen Wei, Beijing (CN); Gang Yan, Beijing (CN); Jiajia Dong, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 32 days.

(21) Appl. No.: 17/708,233

(22) Filed: Mar. 30, 2022

(65) Prior Publication Data

US 2022/0224633 A1    Jul. 14, 2022

Related U.S. Application Data

(63) Continuation of application No. PCT/CN2020/117253, filed on Sep. 23, 2020.

(30) Foreign Application Priority Data

Sep. 30, 2019 (CN) .......................... 201910943510.5

(51) Int. Cl.
*H04L 45/12* (2022.01)
*H04L 45/00* (2022.01)
(Continued)

(52) U.S. Cl.
CPC ............ *H04L 45/127* (2013.01); *H04L 45/20* (2013.01); *H04L 45/507* (2013.01); *H04L 45/741* (2013.01)

(58) Field of Classification Search
CPC ..... H04L 45/127; H04L 45/20; H04L 45/507; H04L 45/741; H04L 45/03; H04L 45/54;
(Continued)

(56) References Cited

U.S. PATENT DOCUMENTS 9,832,031 B2    11/2017 Zhao et al.
9,853,822 B2    12/2017 Wijnands et al.
(Continued)

FOREIGN PATENT DOCUMENTS

CN    103546374 A    1/2014
CN    106341327 A    1/2017
(Continued)

OTHER PUBLICATIONS

K. Xu, Ed. et al, BGP Extensions for BIER, draft-ietf-bier-idr-extensions-06, Network Working Group Internet-Draft, Jan. 22, 2019, total 8 pages.
(Continued)

*Primary Examiner* — Yaotang Wang
(74) *Attorney, Agent, or Firm* — RIMON P.C.

(57) ABSTRACT

A bit index explicit replication (BIER) forwarding entry construction method is provided. The method includes receiving, by a second network device, a first message sent by a first network device, where the first message includes a host routing prefix of the first network device, first BIER information, and second BIER information. The first BIER information includes a bit index forwarding table identifier (BIFT ID) of the first network device, the second BIER information includes a bit forwarding router identifier (BFR ID) of at least one bit forwarding router (BFR) in a first area. The second network device constructs a BIER forwarding entry based on the first BIER information, the second BIER information, and the host routing prefix.

20 Claims, 13 Drawing Sheets

(51) Int. Cl.
*H04L 45/50* (2022.01)
*H04L 45/741* (2022.01)

(58) Field of Classification Search
CPC ......... H04L 45/04; H04L 45/34; H04L 45/50; H04L 45/52; H04L 45/16; H04L 45/745; H04L 61/2592
See application file for complete search history.

(56) References Cited

U.S. PATENT DOCUMENTS

| | | | |
|---|---|---|---|
| 10,574,589 B2* | 2/2020 | Kotalwar | H04L 12/185 |
| 10,637,675 B2 | 4/2020 | Wijnands et al. | |
| 11,438,186 B2* | 9/2022 | Wijnands | H04L 12/1845 |
| 11,483,237 B2* | 10/2022 | Dutta | H04L 47/724 |
| 2015/0138961 A1 | 5/2015 | Wijnands et al. | |
| 2018/0131532 A1 | 5/2018 | Wijnands et al. | |
| 2018/0367456 A1* | 12/2018 | Wijnands | H04L 12/1854 |
| 2019/0097944 A1 | 3/2019 | Kotalwar et al. | |
| 2020/0267011 A1* | 8/2020 | Peng | H04L 12/1854 |

FOREIGN PATENT DOCUMENTS

| | | |
|---|---|---|
| CN | 106656524 A | 5/2017 |
| CN | 107592262 A | 1/2018 |
| CN | 107645446 A | 1/2018 |
| CN | 108667731 A | 10/2018 |
| CN | 109729012 A | 5/2019 |
| EP | 3364614 A1 | 8/2018 |
| IN | 110784411 A | 2/2020 |
| WO | 2018006671 A1 | 1/2018 |
| WO | 2019180305 A1 | 9/2019 |

OTHER PUBLICATIONS

S. Dhanaraj, Ed. et al, LSR Extensions for BIER over Ethernet draft-ietf-bier-lsr-ethernet-extensions-01, Internet Engineering Task Force Internet-Draft, Updates: 8296 (if approved), Jul. 8, 2019, total 15 pages.

J. Xie et al, Encapsulation for BIER in Non-MPLS IPv6 Networks, draft-xie-bier-ipv6-encapsulation-01, Network Working Group Internet-Draft, Jun. 19, 2019, total 15 pages.

J. Xie et al, BIER IPv6 Encapsulation (BIERv6) Support via IS-IS, draft-xie-bier-ipv6-isis-extension-00, Network Working Group Internet-Draft, Jul. 1, 2019, total 8 pages.

Zheng. Zhang et al, BIER Prefix Redistribute, draft-zwzw-bier-prefix-redistribute-02, BIER Internet-Draft, Mar. 10, 2019, total 11 pages.

Z. Zhang et al, Multicast/BIER as a Service, draft-zzhang-bier-multicast-as-a-servic, BIER Internet-Draft, Oct. 22, 2018, total 14 pages.

Request for Comments: 5120, T. Przygienda et al, M-ISIS: Multi Topology (MT) Routing in Intermediate System to Intermediate Systems (IS-ISs), Feb. 2008, total 14 pages.

Request for Comments: 5130, S. Previdi et al, A Policy Control Mechanism in IS-IS Using Administrative Tags, Feb. 2008, total 8 pages.

Request for Comments: 5305, T. Li et al, IS-IS Extensions for Traffic Engineering, Oct. 2008, total 17 pages.

Request for Comments: 5308, C. Hopps, Routing IPV6 with IS-IS, Oct. 2008 total 7 pages.

Request for Comments: 7370, L. Ginsberg et al, Updates to the IS-IS TLV Codepoints Registry, Sep. 2014, total 7 pages.

Request for Comments: 7794, L. Ginsberg, Ed. et al, IS-IS Prefix Attributes for Extended IPV4 and IPV6 Reachability, Mar. 2016, total 9 pages.

Request for Comments: 8279, IJ. Wijnands, Ed. et al, Multicast Using Bit Index Explicit Replication (BIER), Nov. 2017, total 43 pages.

Request for Comments: 8296, IJ. Wijnands, Ed. et al, Encapsulation for Bit Index Explicit Replication (BIER) in MPLS and Non-MPLS Networks, Jan. 2018, total 24 pages.

Request for Comments: 8401, L. Ginsberg, Ed. et al, Bit Index Explicit Replication (BIER) Support via IS-IS, Jun. 2018, total 12 pages.

Request for Comments: 8444, P. Psenak, Ed. et al, OSPFv2 Extensions for Bit Index Explicit Replication (BIER), Nov. 2018, total 12 pages.

S. Previdi, Ed. et al, IS-IS Extensions for Segment Routing, draft-ietf-isis-segment-routing-extensions-25, IS-IS for IP Internets Internet-Draft, May 19, 2019, total 37 pages.

Router Configuration Guide Release 15.0.R1, 3HE 11976 AAAA TOZZA 01, Issue: 01, Mar. 2017, total 356 pages.

* cited by examiner

BIER FORWARDING ENTRY CONSTRUCTION METHOD, APPARATUS, AND SYSTEM

CROSS-REFERENCE TO RELATED APPLICATIONS

This application is a continuation of International Application No. PCT/CN2020/117253, filed on Sep. 23, 2020, which claims priority to Chinese Patent Application No. 201910943510.5, filed on Sep. 30, 2019, both of which are hereby incorporated by reference in their entireties.

TECHNICAL FIELD

This application relates to the network communication field, and more specifically, to a BIER forwarding entry construction method, apparatus, and system.

BACKGROUND

Internet protocol (IP) multicast technology implements highly efficient point-to-multipoint data transmission on an IP network, thereby effectively saving network bandwidth and reducing network load. Therefore, a new technology for constructing a multicast data forwarding path is put forward in the industry, and is referred to as bit index explicit replication (BIER) technology. This technology proposes a new multicast technology architecture that does not need to construct a multicast distribution tree. A bit-forwarding router (BFR) that supports the BIER technology may flood BIER information and construct a BIER forwarding table. The BIER forwarding table is used to guide the BFR in a BIER domain on forwarding a BIER packet in the BIER domain. With wide application of the BIER technology, how to forward a BIER packet across different areas becomes a problem that needs to be addressed urgently.

SUMMARY

This application provides a BIER forwarding entry construction method and apparatus, so as to implement BIER forwarding entry construction across areas, thereby implementing BIER packet forwarding across areas.

According to a first aspect, a bit index explicit replication (BIER) forwarding entry construction method is provided. The method includes: A second network device receives a first message sent by a first network device. The first message includes a host routing prefix of the first network device, first BIER information, and second BIER information. The second network device may construct a BIER forwarding entry based on the first BIER information, the second BIER information, and the host routing prefix. In the BIER forwarding entry, the first network device is a next-hop BFR neighbor of the second network device.

It should be understood that in this application, the first BIER information includes a bit index forwarding table identifier (BIFT ID) of the first network device, and the second BIER information includes a bit forwarding router identifier (BFR ID) of at least one bit-forwarding router (BFR) in a first area. The at least one BFR does not include the first network device. The first network device belongs to the first area and a second area, the second network device belongs to the second area, and the first area and the second area are different.

In the foregoing technical solution, a bit index forwarding table (BIFT) from a network device in the second area to the first area can be constructed based on the host routing prefix of the first network device in the first area, the first BIER information, and the second BIER information, so as to send a BIER packet from the second area to the first area, thereby implementing cross-area forwarding of the BIER packet.

In a possible implementation, the host routing prefix includes a first internet protocol (IP) address, and the first IP address is an IP address of the first network device. The second network device constructs a BIFT entry based on the BFR ID of the at least one BFR in the first area, the first IP address, and the BIFT ID of the first network device. The BIFT entry includes the at least one BFR ID, information about a next-hop BFR neighbor corresponding to the at least one BFR ID, and encapsulation information of the BFR neighbor. The information about the next-hop BFR neighbor includes the first IP address, and the encapsulation information includes the BIFT ID of the first network device.

In another possible implementation, the first message is an interior gateway protocol (IGP) message.

In another possible implementation, the IGP message is an intermediate system to intermediate system (IS-IS) protocol message or an open shortest path first (OSPF) protocol message.

In another possible implementation, that the first area and the second area are different includes:
the first area is an area that runs a first IS-IS level, the second area is an area that runs a second IS-IS level, and the first IS-IS level and the second IS-IS level are different; or
the first area is a first OSPF area, the second area is a second OSPF area, and the first OSPF area and the second OSPF area are different; or
the first area is an area that runs OSPF or BGP, and the second area is an area that runs IS-IS; or
the first area is an area that runs IS-IS or BGP, and the second area is an area that runs OSPF; or
the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or
the first area is a first OSPF area for which a first OSPF process is run on the first network device, the second area is the first OSPF area for which a second OSPF process is run on the first network device, and the first OSPF process and the second OSPF process are different.

In another possible implementation, the first network device is a non-directly connected BFR neighbor of the second network device. The method further includes: The second network device determines a unicast tunnel corresponding to the first IP address, where the BIFT entry includes encapsulation information corresponding to the unicast tunnel.

In another possible implementation, the unicast tunnel is a multiprotocol label switching (MPLS) tunnel, and the BIFT entry includes encapsulation information corresponding to the MPLS tunnel.

In another possible implementation, the unicast tunnel is an internet protocol (IP) tunnel, and the encapsulation information includes the first IP address.

In another possible implementation, the second BIER information further includes a first indication, and the first indication is used to indicate that the second BIER information is BIER information that is of the at least one BFR and that is imported from the first area into the second area.

According to a second aspect, a BIER forwarding entry construction method is provided. The method includes: A first network device sends a first message to a second network device. The first message is used to direct the second network device to construct a bit index explicit replication (BIER) forwarding entry. The first network device may further receive a BIER packet sent by the second network device.

It should be understood that in this application, the first message includes a host routing prefix of the first network device, first BIER information, and second BIER information. The first BIER information includes a bit index forwarding table identifier (BIFT ID) of the first network device. The second BIER information includes a BFR ID of at least one bit-forwarding router (BFR) in a first area. The at least one BFR does not include the first network device. The first network device belongs to the first area and a second area, the second network device belongs to the second area, and the first area and the second area are different.

In another possible implementation, the host routing prefix includes a first internet protocol (IP) address, and the first IP address is an IP address of the first network device. The BIER forwarding entry includes the at least one BFR ID, information about a next-hop BFR neighbor corresponding to the at least one BFR ID, and encapsulation information of the BFR neighbor. The information about the next-hop BFR neighbor includes the first IP address, and the encapsulation information includes the BIFT ID of the first network device.

In another possible implementation, the first message is an interior gateway protocol (IGP) message.

In another possible implementation, the IGP message is an intermediate system to intermediate system (IS-IS) protocol message or an open shortest path first (OSPF) protocol message.

In another possible implementation, that the first area and the second area are different includes:
the first area is an area that runs a first IS-IS level, the second area is an area that runs a second IS-IS level, and the first IS-IS level and the second IS-IS level are different; or
the first area is a first OSPF area, the second area is a second OSPF area, and the first OSPF area and the second OSPF area are different; or
the first area is an area that runs OSPF or BGP, and the second area is an area that runs IS-IS; or
the first area is an area that runs IS-IS or BGP, and the second area is an area that runs OSPF; or
the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or
the first area is a first OSPF area for which a first OSPF process is run on the first network device, the second area is the first OSPF area for which a second OSPF process is run on the first network device, and the first OSPF process and the second OSPF process are different.

In another possible implementation, an IP address with the host routing prefix does not overlap with an IP address with another routing prefix of the first network device.

In another possible implementation, the first network device is a non-directly connected BFR neighbor of the second network device. The BIER forwarding entry further includes encapsulation information corresponding to a unicast tunnel, and the unicast tunnel is a unicast tunnel corresponding to the first IP address.

In another possible implementation, the unicast tunnel is a multiprotocol label switching (MPLS) tunnel, and the BIER forwarding entry includes encapsulation information corresponding to the MPLS tunnel.

In another possible implementation, the unicast tunnel is an internet protocol (IP) tunnel, and the BIER forwarding entry includes the first IP address.

In another possible implementation, the second BIER information further includes a first indication, and the first indication is used to indicate that the second BIER information is BIER information that is of the at least one BFR and that is imported from the first area into the second area.

According to a third aspect, a BIER forwarding entry construction apparatus is provided, where the apparatus includes a receiving module and a construction module.

The receiving module is configured to receive a first message sent by a first network device. The first message includes a host routing prefix of the first network device, first BIER information, and second BIER information.

The construction module is configured to construct a BIER forwarding entry based on the first BIER information, the second BIER information, and the host routing prefix. In the BIER forwarding entry, the first network device is a next-hop BFR neighbor of a second network device.

It should be understood that in this application, the first BIER information includes a bit index forwarding table identifier (BIFT ID) of the first network device, and the second BIER information includes a BFR ID of at least one bit-forwarding router (BFR) in a first area. The at least one BFR does not include the first network device. The first network device belongs to the first area and a second area, the second network device belongs to the second area, and the first area and the second area are different.

In a possible implementation, the host routing prefix includes a first internet protocol (IP) address, and the first IP address is an IP address of the first network device.

The construction module is specifically configured to construct a BIFT entry based on the BFR ID of the at least one BFR in the first area, the first IP address, and the BIFT ID of the first network device. The BIFT entry includes the at least one BFR ID, information about a next-hop BFR neighbor corresponding to the at least one BFR ID, and encapsulation information of the BFR neighbor. The information about the next-hop BFR neighbor includes the first IP address, and the encapsulation information includes the BIFT ID of the first network device.

In another possible implementation, the first message is an interior gateway protocol (IGP) message.

In another possible implementation, the IGP message is an intermediate system to intermediate system (IS-IS) protocol message or an open shortest path first (OSPF) protocol message.

In another possible implementation, that the first area and the second area are different includes:
the first area is an area that runs a first IS-IS level, the second area is an area that runs a second IS-IS level, and the first IS-IS level and the second IS-IS level are different; or
the first area is a first OSPF area, the second area is a second OSPF area, and the first OSPF area and the second OSPF area are different; or
the first area is an area that runs OSPF or BGP, and the second area is an area that runs IS-IS; or the first area is an area that runs IS-IS or BGP, and the second area is an area that runs OSPF; or the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or the first area is a first OSPF area for which a first OSPF process is run on the first network device, the second area is the first OSPF area for which a second OSPF process is run on the first network device, and the first OSPF process and the second OSPF process are different.

In another possible implementation, the first network device is a non-directly connected BFR neighbor of the second network device. The apparatus further includes:

a determining module, configured to determine a unicast tunnel corresponding to the first IP address, where the BIFT entry includes encapsulation information corresponding to the unicast tunnel.

In another possible implementation, the unicast tunnel is a multiprotocol label switching (MPLS) tunnel, and the BIFT entry includes encapsulation information corresponding to the MPLS tunnel.

In another possible implementation, the unicast tunnel is an internet protocol (IP) tunnel, and the encapsulation information includes the first IP address.

In another possible implementation, the second BIER information further includes a first indication, and the first indication is used to indicate that the second BIER information is BIER information that is of the at least one BFR and that is imported from the first area into the second area.

According to a fourth aspect, a bit index explicit replication (BIER) forwarding entry construction apparatus is provided. The apparatus includes a sending module and a receiving module.

The sending module is configured to send a first message to a second network device. The first message is used to direct the second network device to construct a bit index explicit replication (BIER) forwarding entry.

The receiving module is configured to receive a BIER packet sent by the second network device.

It should be understood that in this application, the first BIER information includes a bit index forwarding table identifier (BIFT ID) of the first network device, and the second BIER information includes a BFR ID of at least one bit-forwarding router (BFR) in a first area. The at least one BFR does not include the first network device. The first network device belongs to the first area and a second area, the second network device belongs to the second area, and the first area and the second area are different.

In a possible implementation, the host routing prefix includes a first internet protocol (IP) address, and the first IP address is an IP address of the first network device. The BIER forwarding entry includes the at least one BFR ID, information about a next-hop BFR neighbor corresponding to the at least one BFR ID, and encapsulation information of the BFR neighbor. The information about the next-hop BFR neighbor includes the first IP address, and the encapsulation information includes the BIFT ID of the first network device.

In another possible implementation, the first message is an interior gateway protocol (IGP) message.

In another possible implementation, the IGP message is an intermediate system to intermediate system (IS-IS) protocol message or an open shortest path first (OSPF) protocol message.

In another possible implementation, that the first area and the second area are different includes:

the first area is an area that runs a first IS-IS level, the second area is an area that runs a second IS-IS level, and the first IS-IS level and the second IS-IS level are different; or the first area is a first OSPF area, the second area is a second OSPF area, and the first OSPF area and the second OSPF area are different; or the first area is an area that runs OSPF or BGP, and the second area is an area that runs IS-IS; or the first area is an area that runs IS-IS or BGP, and the second area is an area that runs OSPF; or the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or the first area is a first OSPF area for which a first OSPF process is run on the first network device, the second area is the first OSPF area for which a second OSPF process is run on the first network device, and the first OSPF process and the second OSPF process are different.

In another possible implementation, the IP address with the host routing prefix does not overlap with the IP address with another routing prefix of the first network device.

In another possible implementation, the first network device is a non-directly connected BFR neighbor of the second network device. The BIER forwarding entry further includes encapsulation information corresponding to a unicast tunnel, and the unicast tunnel is a unicast tunnel corresponding to the first IP address.

In another possible implementation, the unicast tunnel is a multiprotocol label switching (MPLS) tunnel, and the BIER forwarding entry includes encapsulation information corresponding to the MPLS tunnel.

In another possible implementation, the unicast tunnel is an internet protocol (IP) tunnel, and the BIER forwarding entry includes the first IP address.

In another possible implementation, the second BIER information further includes a first indication, and the first indication is used to indicate that the second BIER information is BIER information that is of the at least one BFR and that is imported from the first area into the second area.

According to a fifth aspect, a second network device is provided, including a processor and a memory. The memory is configured to store a computer program, and the processor is configured to invoke the computer program from the memory and run the computer program, to enable the second network device to perform the method according to any one of the first aspect or the possible implementations of the first aspect.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

According to a sixth aspect, a first network device is provided, including a processor and a memory. The memory is configured to store a computer program, and the processor is configured to invoke the computer program from the memory and run the computer program, to enable the first network device to perform the method according to any one of the second aspect or the possible implementations of the second aspect.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

According to a seventh aspect, a computer program product is provided. The computer program product includes a computer program and/or code. When the computer program and/or code are/is run on a computer, the computer is enabled to perform the method according to any one of the first aspect or the possible implementations of the first aspect.

According to an eighth aspect, a computer-readable medium is provided. The computer-readable medium stores a program and/or code. When the program and/or code are/is run on a computer, the computer is enabled to perform the method according to any one of the second aspect or the possible implementations of the second aspect.

According to a ninth aspect, a BIER forwarding entry construction system is provided. The system includes the apparatus according to any one of the third aspect or the possible implementations of the third aspect and the apparatus according to any one of the fourth aspect or the possible implementations of the fourth aspect.

DESCRIPTION OF EMBODIMENTS

The following describes technical solutions in this application with reference to the accompanying drawings.

Internet protocol (IP) multicast technology implements highly efficient point-to-multipoint data transmission on an IP network, thereby effectively saving network bandwidth and reducing network load. Therefore, internet protocol multicast technology is widely used in real-time data transmission, multimedia conferencing, data copy, internet protocol television (IPTV), games, simulation, and the like. The multicast technology uses a multicast protocol to construct a control plane multicast tree, and then uses the multicast tree to make a network plane in a logical tree structure, to implement multicast point-to-multipoint data forwarding. Each intermediate node centered around constructing a distribution tree needs to maintain a complex multicast forwarding information state. As the network scale becomes larger and multicast data traffic increases, this multicast technology faces increasingly high costs and operation and maintenance challenges.

Figure 1:
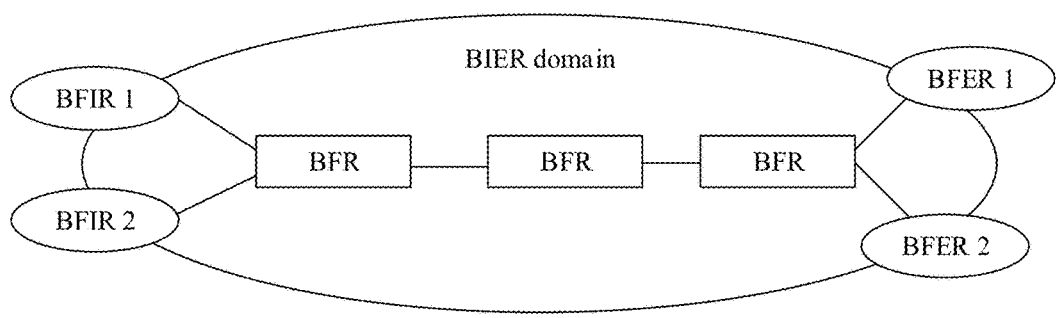
FIG. 1 is a schematic networking diagram of a BIER technology according to an embodiment of this application.

Therefore, a new technology for constructing a multicast data forwarding path is put forward in the industry, and is referred to as a bit index explicit replication (BIER) technology. This technology proposes a multicast technology architecture that does not need to construct a multicast distribution tree. As shown in FIG. 1, a router that supports the BIER technology may be referred to as a bit-forwarding router (BFR), and the BFR may receive and forward a BIER packet. A multicast forwarding domain including one or more BFRs is referred to as a BIER domain. At the ingress of a BIER domain, a BFR that performs BIER encapsulation on the original multicast data packet is referred to as a Bit-Forwarding ingress router (BFIR). At the egress of a BIER domain, a BFR that performs decapsulation to obtain the original multicast data packet from the BIER packet is referred to as a Bit-Forwarding egress router (BFER). It should be understood that a BFIR or a BFER in a BIER domain may be referred to as an edge BFR in the BIER domain.

In a BIER domain, a globally unique bit position identifier may be configured for an edge BFR in an entire BIER sub-domain (SD). As an example, a value is configured for each edge BFR as a BFR identifier (BFR ID). For example, the BFR ID may be a value ranging from 1 to 256. In the BIER domain, all the BFR IDs form a bit string. When an original multicast data packet (which may also be referred to as a BIER packet) is transmitted in the BIER domain, an extra specific BIER header needs to be encapsulated, and all destination nodes of the original multicast data packet are marked in a form of a bit string in the BIER header. For example, a format of an encapsulated original multicast data packet is: the BIER header+the original multicast data packet. The BFR in the BIER domain may perform forwarding based on a bit index forwarding table (BIFT) and the bit string carried in the BIER header, to ensure that the original multicast data packet can be sent to all destination addresses.

It should be noted that the destination node of the original multicast data packet in this application may be one BFER or a set of a plurality of BFERs. For ease of description, the BFER or the set of the plurality of BFERs to which the original multicast data packet needs to be sent is referred to as the destination node below.

It should be understood that the original multicast data packet after the BIER header may be an internet protocol version 6 (IPv6) multicast packet, or may be an internet protocol version 4 (IPv4) multicast packet.

Figure 2:
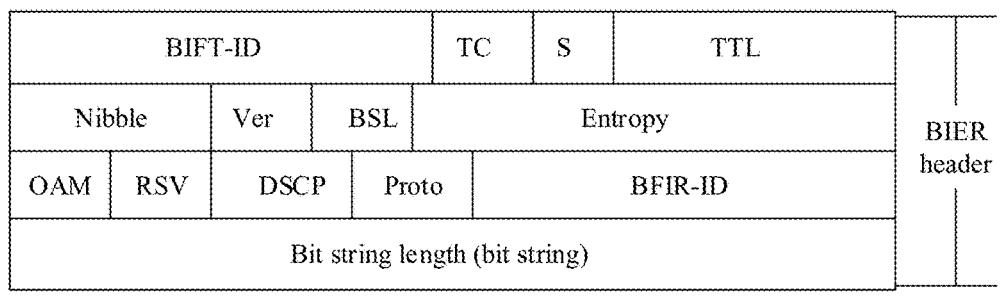
FIG. 2 is a schematic diagram of a BIER header format according to an embodiment of this application.

For a schematic block diagram of a possible BIER header format, refer to FIG. 2. As shown in FIG. 2, a BIER header may include but is not limited to: a bit index forwarding table identifier (BIFT ID) whose length is 20 bits, a bit string length (BSL), and 64 bits (8 bytes) of other fields, for example, a traffic class (TC), a stack (S), a time to live (TTL), a version number (Ver), a proto field, or the like of the original multicast data packet after the BIER header.

To facilitate understanding, the following describes each field in the BIER header in detail.

(1) BIFT ID

The length of the BIFT ID field is 20 bits. In BIER-multiprotocol label switching (MPLS) encapsulation, the BIFT ID field is a label (L). The BIFT ID may be a BIFT-id, and may include a combination of a sub-domain (SD)/bit string length (BSL)/set identifier (SI). Different BIFT IDs may correspond to different SD/BSL/SI combinations.

1. Sub-Domain (SD)

A BIER domain may be configured as different sub-domains SDs based on a requirement of an actual service scenario. Each sub-domain SD is represented by using a sub-domain identifier (SD-ID). For example, a value of the SD-ID ranges from 0 to 255, and a length is 8 bits. For example, the BIER domain may be configured as different SDs for different services, for example, virtual private networks (VPN), and different VPNs are configured to use different SDs. For example, a VPN 1 uses an SD 0, and a VPN 2 uses an SD 1.

It should be noted that a plurality of VPNs may alternatively use the same SD, and the different SDs in the BIER domain may be in the same interior gateway protocol (IGP) process or topology, or may not be in the same IGP process or topology. This is not specifically limited in this embodiment of this application.

2. Bit String Length (BSL)

A BSL is a length of a bit string included in the BIER header. There may be a plurality of BSL types. This is not specifically limited in this embodiment of this application. A minimum length of the BSL is 64 bits. A length of the BSL may be successively 128 bits, 256 bits, 512 bits, 1024 bits, or 2048 bits. A maximum length of the BSL is 4096 bits. Specifically, four bits are used for identification in the packet. For example, when the length of the BSL is 64 bits, 0001 is used for identification in the packet; when the length of the BSL is 128 bits, 0010 is used for identification in the packet; when the length of the BSL is 512 bits, 0100 is used for identification in the packet; when the length of the BSL is 1024 bits, 0101 is used for identification in the packet, and so on.

3. Set Identifier (SI)

The SI may be understood as a set including a plurality of edge BFRs or configured BFR IDs in the network. As an example, when the length of the BSL is 256 bits, but there are more than 256 edge BFRs or 256 configured BFR IDs in the network, these edge BFRs or BFR IDs need to be divided into different sets. For example, 256 edge BFRs whose BFR IDs are 1 to 256 are a set 0 (set index 0, or SI=0), and 256 edge BFRs whose BFR IDs are 257 to 512 are a set 1 (set index 1, or SI=1).

After receiving a BIER packet, the BFR in the BIER domain may determine, based on a BIFT ID in a BIER header, a combination including an SD to which the BIER packet belongs, a used BSL, and an SI of the BSL to which the packet belongs.

The following lists several possible SD/BSL/SI combinations represented by the BIFT ID:

BIFT ID=1: corresponding to SD 0, BSL 256, SI 0//equivalent to SD 0/BSL 256/SI 0.
BIFT ID=2: corresponding to SD 0, BSL 256, SI 1//equivalent to SD 0/BSL 256/SI 1.
BIFT ID=3: corresponding to SD 0, BSL 256, SI 2//equivalent to SD 0/BSL 256/SI 2.
BIFT ID=4: corresponding to SD 0, BSL 256, SI 3//equivalent to SD 0/BSL 256/SI 3.
BIFT ID=5: corresponding to SD 0, BSL 512, SI 0//equivalent to SD 0/BSL 512/SI 0.
BIFT ID=6: corresponding to SD 0, BSL 512, SI 1//equivalent to SD 0/BSL 512/SI 1.
BIFT ID=7: corresponding to SD 1, BSL 256, SI 0//equivalent to SD 1/BSL 256/SI 0.
BIFT ID=8: corresponding to SD 1, BSL 256, SI 1//equivalent to SD 1/BSL 256/SI 1.
BIFT ID=9: corresponding to SD 1, BSL 256, SI 2//equivalent to SD 1/BSL 256/SI 2.
BIFT ID=10: corresponding to SD 1, BSL 256, SI 3//equivalent to SD 1/BSL 256/SI 3.
BIFT ID=11: corresponding to SD 1, BSL 512, SI 0//equivalent to SD 1/BSL 512/SI 0.
BIFT ID=12: corresponding to SD 1, BSL 512, SI 1//equivalent to SD 1/BSL 512/SI 1.

(2) Bit String

Each bit in the bit string is used to identify an edge BFR. For example, a least significant bit (rightmost bit) of the bit string is used to identify a BFER whose BFR-ID is 1. A 2nd bit from right to left in the bit string is used to identify a BFER whose BFR-ID is 2. In a forwarding entry on which a forwarding plane performs forwarding is based, BFERs to which a packet is to be sent are determined based on a bit string in the packet. When the BFR in the BIER domain receives a BIER packet header, the BFR forwards the BIER packet based on a bit string and a BIFT ID that are carried in the BIER header.

BIFT ID=2 is used as an example. After receiving the BIER packet, the BFR may obtain, based on the BIFT ID in the BIER header, that the BIER packet belongs to an SD 0. A length of the BSL used in the BIER header is 256 bits, and the BIFT ID belongs to a set 1 (including a set of 256 edge BFRs whose BFR IDs are 257 to 512).

(3) Proto Field

The proto field equal to 4 represents that the original multicast data packet after the BIER header is an IPv4 packet, and the proto field equal to 6 represents that the original multicast data packet after the BIER header is an IPv6 packet.

Figure 3:
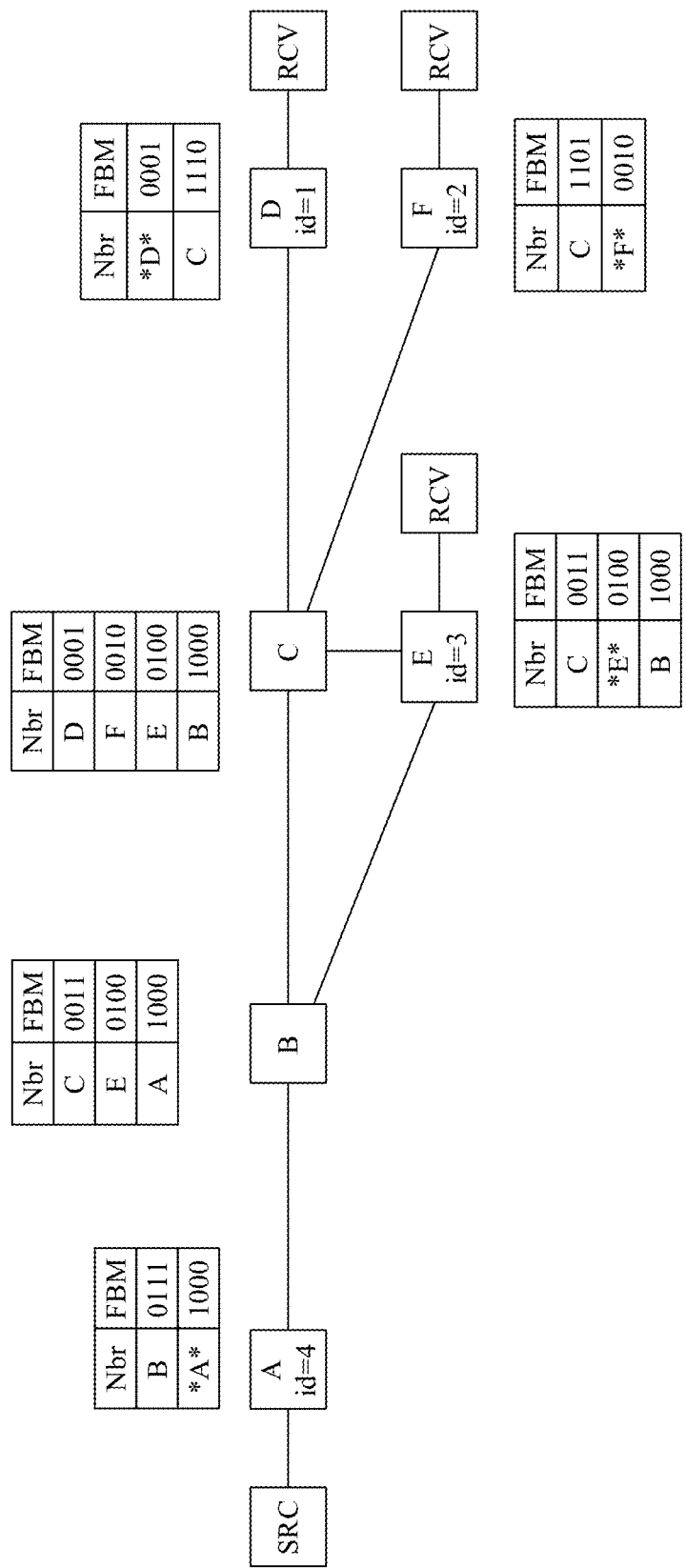
FIG. 3 is a schematic diagram of BIFT entry construction according to an embodiment of this application.
Figure 4:
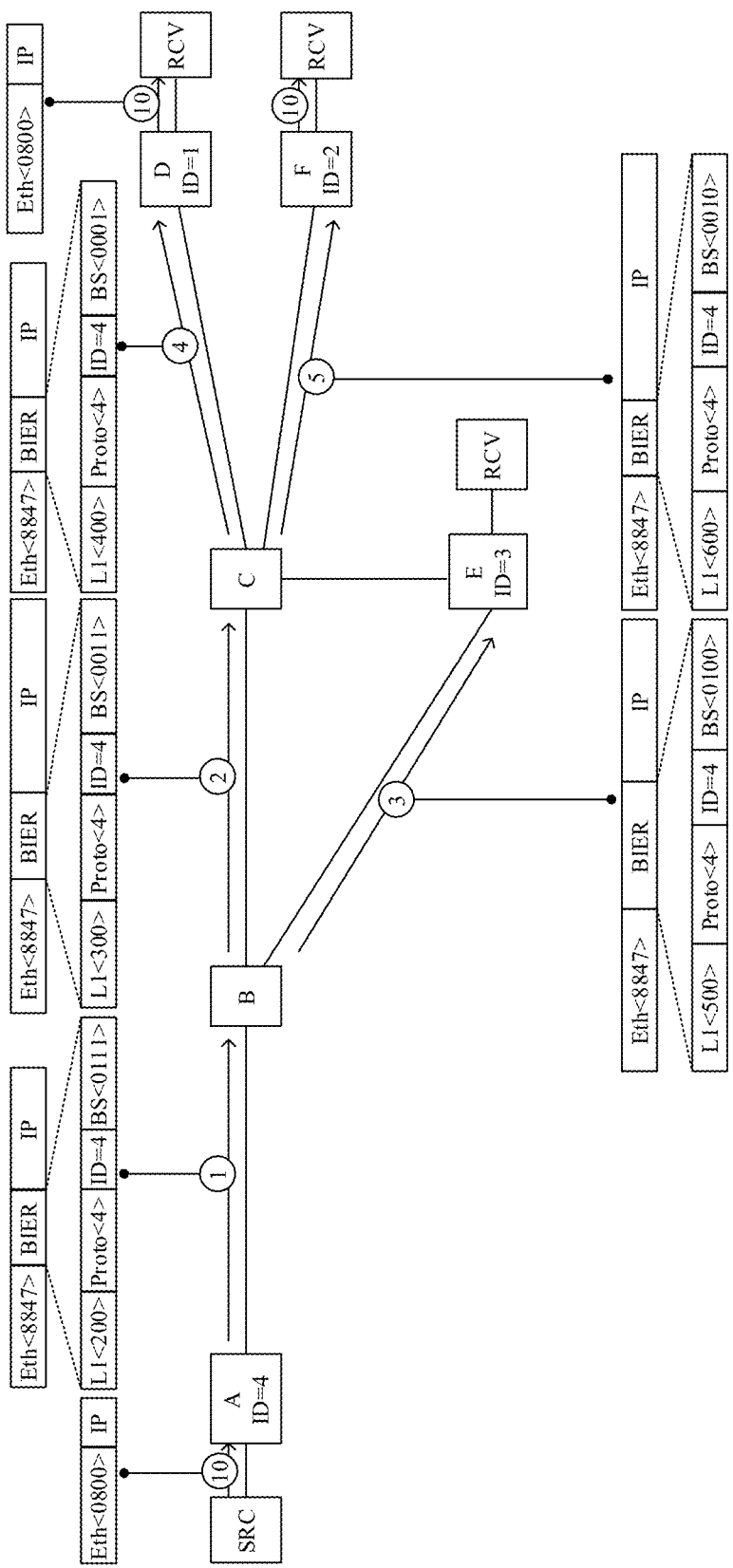
FIG. 4 is a schematic block diagram of sending a BIER packet based on a BIER header in a BIER domain according to an embodiment of this application.

The following describes, with reference to FIG. 3 and FIG. 4, in detail a process of constructing a BIER forwarding table based on a BIER technology and forwarding a BIER packet.

A BIER domain shown in FIG. 3 may include a node A to a node F. The node A, the node D, the node E, and the node F are edge BFRs in the BIER domain, and the node B and the node C are BIER intermediate forwarding nodes. Specifically, the node A is located at an ingress of the BIER domain, and is responsible for performing BIER encapsulation on an original multicast data packet. The node A corresponds to the BFIR in FIG. 1. The node D, the node E, and the node F are located at an egress of the BIER domain, and are responsible for performing decapsulation to obtain the original multicast data packet from the BIER packet. The node D, the node E, and the node F correspond to the BFIR in FIG. 1. In this embodiment of this application, a unique BFR-ID may be allocated to an edge BFR in each BIER domain. For example, in FIG. 3, BFR-IDs configured for the node A, the node D, the node E, and the node F are respectively 4, 1, 2, and 3. No BFR-ID is allocated to intermediate forwarding BFRs, for example, the node B and the node C. Therefore, BFR-IDs corresponding to the node B and the node C are 0.

A bit string encapsulated in a BIER header of data traffic marks all destination nodes of the traffic. For example, a bit string corresponding to the node D whose BFR-ID is 1 is 0001, a bit string corresponding to the node F whose BFR-ID is 2 is 0010, a bit string corresponding to the node E whose BFR-ID is 3 is 0100, and the bit string corresponding to the node A whose BFR-ID is 4 is 1000.

It should be understood that a value of the BFR-ID allocated to the edge BFR in each BIER domain may be flooded to another BFR in the BIER domain according to a routing protocol, and flooded BIER information further includes an IP address and encapsulation information of the edge BFR. For example, flooded BIER information of the node A carries an IP address and a BIFT-id of the node A. The BFR (for example, the node F in FIG. 3) in the BIER domain may construct a BIFT entry based on the flooded BIER information, so that after the node F in FIG. 3 receives the BIER packet, the BIER packet is forwarded to a destination node based on the constructed BIFT entry.

For the node A, if the BIER packet needs to be sent to BFERs whose BFR-IDs are respectively 1, 2, and 3, the BIER packet needs to be first sent to a neighbor (the node B) of the node A, and an edge BFR whose BFR-ID is 4 is the node A itself. Therefore, a BIFT entry constructed by the node A is shown as follows:

forwarding entry 1: neighbor (Nbr)=B, and forwarding bit mask (FBM)=0111; and forwarding entry 2: Nbr*=A, and FBM=1000.

The forwarding entry 1 is used to represent that when any one of the 1st bit, the 2nd bit, and the 3rd bit from right to left in the bit string of the BIER packet is 1, the BIER packet is sent to the neighbor (the node B) of the node A. The forwarding entry 2 is used to represent that when the 4th bit from right to left in the bit string of the BIER packet is 1, the BIER packet is sent to the node A itself. Therefore, the node A removes the BIER header and performs forwarding based on information in the original multicast data packet.

It should be noted that, in the forwarding entry, * is used to indicate that Nbr is a node itself. Similarly, another node in FIG. 3 may also construct a BIFT entry based on a neighboring node of another node itself. For the BIFT entry constructed by another node, refer to FIG. 3. Details are not described herein again.

After receiving the original multicast data packet, the node A being as the BFIR at the ingress of the BIER domain encapsulates the BIER header before the original multicast data packet. It should be understood that, for ease of description, the node A being as the BFIR at the ingress of the BIER domain is referred to as an ingress node A for short below. As an example, after receiving the original multicast data packet, the ingress node A may learn of a destination node of the original multicast data packet based on a BFR-ID flooded by using a border gateway protocol BGP message. For example, a receiver of the original multicast data packet is a destination node E whose BFR-ID is 3, a destination node F whose BFR-ID is 2, and a destination node D whose BFR-ID is 1. The node A encapsulates a BIER packet with the BIER header in which the bit string is 0111, and forwards the encapsulated BIER packet to the neighboring node B based on the forwarding entry 1. After receiving the BIER packet, the node B determines, based on the bit string 0111 and the BIFT entry, that the BIER packet needs to be separately sent to the node C and the node E. When sending the BIER packet to the node C, the node B may perform an AND operation on the bit string (0111) in the BIER header and an FBM field corresponding to Nbr=C in the BIFT entry. In this embodiment of this application, a result of the AND operation is 0011. Therefore, the node B may modify the bit string in the BIER header to 0011 and send the BIER packet to the node C. Similarly, when sending the BIER packet to the node E, the node B may modify the bit string in the BIER header to 0100. After receiving the BIER packet, the node E determines, based on the bit string 0100, that the BIER packet is to be sent to a neighboring node E. Because the node E determines that the neighboring node E is the node E itself based on an identifier * in the forwarding table, the node E being as an egress BFER in the BIER domain may perform decapsulation to obtain the original multicast data packet from the BIER packet, and perform forwarding based on inner information in the original multicast data packet.

In BIER-MPLS encapsulation, a first 32 bits of the BIER header are an MPLS label code, and a first 20 bits of the first 32 bits are an MPLS label value. The MPLS label value changes in a forwarding process. For example, when the ingress node A sends a packet to the node B, an MPLS label value of the node B needs to be encapsulated. When the node B sends a packet to the node C, an MPLS label value of the node C needs to be encapsulated. In this embodiment of this application, MPLS label values allocated by the node A/the node B/the node C/the node D/the node E/the node F are respectively 100/200/300/400/500/600, and these MPLS label values need to be carried in the BIER encapsulation information and flooded to the another BFR in the BIER domain according to the routing protocol, so that the node A can learn of the MPLS label value of the node B. The MPLS label that identifies the BIER information is also referred to as a BIER label.

For example, referring to FIG. 4, an ingress node A sends a BIER packet to a node B. An encapsulation format of the BIER packet is an ethernet (ETH) header+a BIER header+ an IP multicast data packet. An MPLS label and a label value (L1<200>) of the node B are encapsulated in an MPLS label value field in the BIER header, a proto field is equal to 4, and a BFR-ID equal to 4 allocated to the ingress node A is encapsulated in a BFR-ID field, and 0111 is encapsulated in a bit string (BS) field. It should be understood that a value encapsulated in the ETH header varies with an encapsulation format.

In this embodiment of this application, a bit position configured by the edge BFR is flooded in the BIER domain in advance by using the interior gateway protocol (IGP) or the border gateway protocol (BGP), so that each BFR in the BIER domain constructs a bit index forwarding table (BIFT) for guiding forwarding of the original multicast data packet in the BIER domain. The information flooded in the BIER domain by using the IGP or the BGP is referred to as the BIER information. When receiving the BIER packet encapsulated with the BIER header, the BFR forwards the BIER packet to the destination node based on the BIFT entry.

In this embodiment of this application, the interior gateway protocol (IGP) may include but is not limited to the open shortest path first (OSPF) protocol, the intermediate system to intermediate system (IS-IS) protocol, and the like.

It should be understood that the BIER domain refers to a network area in which the BIER information can be flooded by using the IGP or the BGP and the BIFT entry can be constructed. The BIER domain includes the BFIR and the BFER. The BIER information may include but is not limited to a BFR ID of each edge BFR. As an example, the IGP is deployed and the BIER information is flooded in an autonomous system (AS) domain. The AS domain is the BIER domain.

Generally, a large-scale network is divided into a plurality of domains. For example, the network can be divided into different ASs based on different administrative domains. A border of the AS may be an autonomous system border router (ASBR). The IGP may be deployed and the BIER information is flooded in different AS domains. If the BGP is deployed between a plurality of AS domains, but the BIER information is not flooded, the plurality of AS domains may be different BIER domains.

When IGP is deployed in the same AS domain and BIER information is flooded, the AS domain may be further divided into different IGP areas because there is a relatively large quantity of BFRs. For example, when the OSPF protocol is deployed in an AS domain, the AS domain may be further divided into different OSPF areas, for example, a backbone area (area 0) and a non-backbone area (area X). The two areas are connected to each other by using an area border router (ABR). An area to which the ABR belongs may be configured on the ABR. For example, whether the ABR belongs to the backbone area or the non-backbone area may be configured. For another example, when an IS-IS protocol is deployed in an AS domain, the AS domain may be further divided into different IS-IS levels, for example, a level (level) 1 and a level 2. The level 1 and the level 2 may be similar to the non-backbone area and the backbone area in OSPF. The two areas level 1 and level 2 are connected to each other by using an ABR. An area to which the ABR belongs may be configured on the ABR. For example, it may be configured that the ABR belongs to both the level 1 and the level 2.

The foregoing processes of flooding the BIER information, constructing the BIFT entry, and forwarding the BIER packet are all performed in one area. The area is not specifically limited in the embodiments of this application. The area may be an AS domain, may be an OSPF area in an AS domain, may be an IS-IS area in an AS domain, may be an OSPF process, or may be an IS-IS process.

Figure 5:
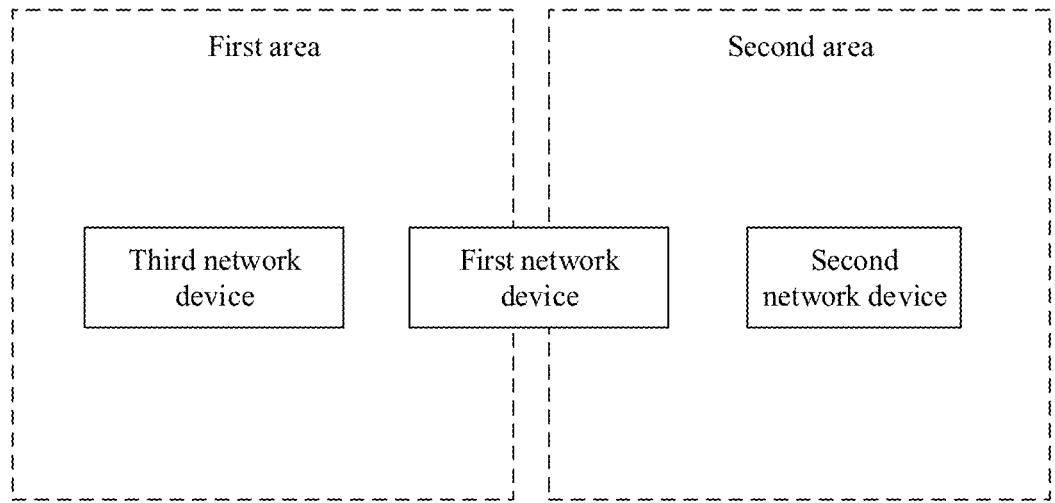
FIG. 5 is a schematic diagram of a multi-area scenario applicable to an embodiment of this application.

FIG. 5 is a schematic diagram of a multi-area scenario applicable to an embodiment of this application. Referring to FIG. 5, for example, a network includes two areas, for example, a first area and a second area. A first network device serves as an ABR and connects the first area and the second area.

It should be noted that the first area and the second area are not specifically limited in this embodiment of this application. For example, the first area is an area that runs a first IS-IS level, the second area is an area that runs a second IS-IS level, and the first IS-IS level and the second IS-IS level are different. For another example, the first area is a first OSPF area, the second area is a second OSPF area, and the first OSPF area and the second OSPF area are different. For another example, the first area is an area that runs OSPF or BGP, and the second area is an area that runs IS-IS. For another example, the first area is an area that runs IS-IS or BGP, and the second area is an area that runs OSPF. For another example, the first area is an area that runs a first IS-IS level and a first IS-IS process is run on the first network device corresponding to this area, the second area is an area that runs the first IS-IS level and a second IS-IS process is run on the first network device corresponding to this area, and the first IS-IS process and the second IS-IS process are different. For another example, the first area is a first OSPF area and a first OSPF process is run on the first network device corresponding to this area, the second area is the first OSPF area and a second OSPF process is run on the first network device corresponding to this area, and the first OSPF process and the second OSPF process are different.

Referring to FIG. 5, the first area includes one first network device and at least one third network device. The first network device serves as an area border router and connects the first area and the second area. In the first area, a BFR ID is configured for each of at least one third network device on an edge of the first area. For example, the BFR ID is a value from 1 to 256. The BFR ID of the at least one third network device on the edge of the first area is flooded in the first area in advance by using the IGP or BGP, so that network devices in the first area construct a bit index forwarding table (BIFT) for guiding forwarding of an original multicast data packet in the first area. When receiving a BIER packet encapsulated with a BIER header, the network devices in the first area forward, in a BIER domain, the BIER packet to a destination node based on a BIFT entry.

It should be understood that the first network device and the at least one third network device correspond to edge BFRs in FIG. 1. The network devices in the first area include the edge BFRs and a BFR that performs intermediate forwarding of the BIER packet in the first area.

The second area includes the first network device and at least one second network device. The second area is connected to the first area by using the first network device. Optionally, in this embodiment of this application, a corresponding BFR ID may be further configured for a network device in the second area. For example, the BFR ID is a value from 1 to 256. Optionally, if a BFR ID is configured for the at least one second network device in the second area, the BFR ID may be flooded in the second area in advance by using the IGP or BGP, so that network devices in the second area construct a bit index forwarding table (BIFT) for guiding forwarding of an original multicast data packet in the second area. When receiving a BIER packet encapsulated with a BIER header, the network devices in the second area forward, in a BIER domain, the BIER packet to a destination node based on a BIFT entry.

It should be understood that the at least one second network device may correspond to a BFR in FIG. 1. Optionally, the at least one second network device may further correspond to an edge BFR in FIG. 1. The network devices in the second area include the edge BFR. Optionally, the network devices in the second area may further include a BFR that performs intermediate forwarding of the BIER packet.

An embodiment of this application provides a bit index explicit replication (BIER) forwarding entry construction method. By using the method, BIER information of an outside area may be imported into the current area by using a routing message and flooded to a BFR in the current area; and a BIFT entry to the outside area is constructed in the current area, so that the BFR in the current area may forward a BIER packet across areas based on the BIFT entry. The following describes in detail the method provided in this embodiment of this application with reference to FIG. 6.

Figure 6:
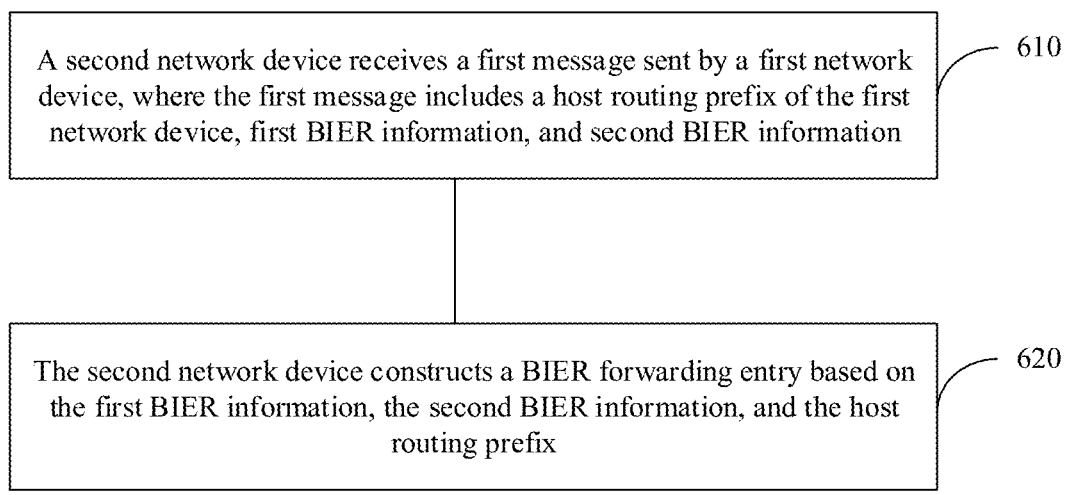
FIG. 6 is a schematic flowchart of a BIER forwarding entry construction method according to an embodiment of this application.

FIG. 6 is a schematic flowchart of the bit index explicit replication (BIER) forwarding entry construction method according to this embodiment of this application. The method includes steps 610 and 620. The following separately describes steps 610 and 620 in detail.

Step 610: A second network device receives a first message sent by a first network device, where the first message includes a host routing prefix of the first network device, first BIER information, and second BIER information.

The first network device belongs to a first area and a second area, the second network device belongs to the second area, and the first area and the second area are different. That the first network device belongs to both the first area and the second area may be understood as follows: At least one interface on the first network device runs a protocol of the first area, and at least one interface on the first network device runs a protocol of the second area.

The first message may include the host routing prefix of the first network device, the first BIER information, and the second BIER information. The first BIER information may include a BIFT ID of the first network device, and the second BIER information may be a BFR ID of at least one BFR in the first area.

It should be understood that the BIFT ID may also be referred to as a BIFT-id. The BFR ID of the at least one BFR in the second BIER information does not include a BFR ID of the first network device.

Specifically, the BIFT ID of the first network device corresponds to a combination of SD/BSL/SI. In BIER-MPLS encapsulation, a BIFT ID is a label (L). In this way, when the second network device sends a BIER packet to the first network device, the BIFT ID of the first network device is encapsulated in a BIFT ID field in a header of the BIER packet. For specific descriptions of the BIFT ID, refer to the foregoing descriptions. Details are not described herein again.

In this embodiment of this application, the host routing prefix in the first message sent by the first network device may not overlap with or may overlap with an address range of another routing prefix sent by the first network device. For example, that the host routing prefix in the first message does not overlap with the address range of the another routing prefix sent by the first network device means that a host routing prefix other than the another routing prefix needs to be selected. For example, the host routing prefix sent by the first network device is 1.1.1.1/32, and the first network device further sends prefixes 192.168.1.0/24 and 192.168.2.0/24. Address ranges of these routing prefixes do not overlap. For another example, the host routing prefix in the first message overlaps with the address range of another routing prefix sent by the first network device. For example, the host routing prefix sent by the first network device is 1.1.1.1/32, and the first network device further sends a default routing prefix such as 0.0.0.0/0. Address ranges of these routing prefixes overlap.

Step 620: The second network device constructs a BIER forwarding entry based on the first BIER information, the second BIER information, and the host routing prefix.

The second network device may construct the BIER forwarding entry based on the first BIER information, the second BIER information, and the host routing prefix, so that the second network device sends the BIER packet from the second network device to the first network device based on the BIER forwarding entry.

For example, the host routing prefix may include a first internet protocol (IP) address. The first IP address is an IP address of the first network device. The second network device may construct a BIFT entry based on the BFR ID of the at least one BFR in the first area, the BIFT ID of the first network device, and the first IP address. The BIFT entry may include the at least one BFR ID, information about a next-hop BFR neighbor corresponding to the at least one BFR ID, and encapsulation information of the BFR neighbor. The information about the next-hop BFR neighbor includes the first IP address, and the encapsulation information includes the BIFT ID of the first network device.

It should be understood that in this embodiment of this application, in the BIER forwarding entry, the first network device is a next-hop BFR neighbor of the second network device.

For example, a possible BIFT entry constructed by the second network device is shown in Table 1:

Table 1 (BFR-Nbr, FBM)

In the table, the FBM includes a BFR ID that is of at least one edge BFR in the first area and that is carried in the first message, and may also include the BFR ID of the first network device. The BFR neighbor (BFR-neighbor, BFR-Nbr) represents a next-hop BFR neighbor to the at least one edge BFR in the first area included in the FBM. The BFR-Nbr is a BFR that supports BIER forwarding. In this embodiment of this application, for example, corresponding to FIG. 5, the FBM includes a BFR ID of the at least one third network device, and may also include the BFR ID of the first network device. The first network device is the next-hop BFR neighbor (BFR-Nbr) of the second network device. The BFR-Nbr is the first network device, and an IP address of the BFR-Nbr is the first IP address of the first network device.

In this embodiment of this application, the first network device may be a next-hop BFR neighbor (BFR-Nbr) directly connected to the second network device, or may be a next-hop BFR neighbor (BFR-Nbr) non-directly connected to the second network device. This is not specifically limited in this embodiment of this application.

It should be understood that the first network device being a next-hop BFR neighbor directly connected to the second network device may be understood as follows: The first network device and the second network device are connected to each other. The first network device being a next-hop BFR neighbor non-directly connected to the second network device may be understood as follows: A network device that does not support BIER forwarding (non-BIER network device) is further included between the first network device and the second network device.

For example, another possible BIFT entry constructed by the second network device is shown in Table 2:

Table 2 (BFR-Nbr, BIFT-id)

In the table, the BIFT-id represents encapsulation information of the BFR-Nbr. In this embodiment of this application, the first network device is the next-hop BFR neighbor (BFR-Nbr) of the second network device, and the BIFT-id is encapsulation information of the first network device. In BIER-MPLS encapsulation, the BIFT-id is a label (label).

It should be noted that Table 1 and Table 2 may serve as two separate tables, or Table 1 and Table 2 may alternatively be combined, for example, to obtain Table 3 (BFR-Nbr, FBM, BIFT-id). It may be understood that the FBM in Table 3 includes the BFR ID that is of the at least one edge BFR in the first area and that is carried in the first message, and may also include the BFR ID of the first network device. The BFR-Nbr represents the next-hop BFR neighbor to the at least one edge BFR in the first area included in the FBM. The BIFT-id represents the encapsulation information of the BFR-Nbr. For example, corresponding to FIG. 5, the FBM includes the BFR ID of the at least one third network device, and may also include the BFR ID of the first network device. The first network device is the next-hop BFR neighbor (BFR-Nbr) of the second network device. The BFR-Nbr is the first network device, and an IP address of the BFR-Nbr is the first IP address of the first network device. The BIFT-id is the encapsulation information of the first network device.

It should be understood that in a possible implementation, the first IP address may be included in the host routing prefix of the first network device. The host routing prefix of the first network device includes the first IP address. Specifically, when the first IP address is an IPv4 address, a length of the host routing prefix is 32 bits. When the first IP address is an IPv6 address, a length of the host routing prefix is 128 bits. In another possible implementation, the BIFT entry of the second network device includes a BFR ID of at least one BFR in an outside area and BFR-Nbr information corresponding to the at least one BFR. When the BFR-Nbr is the first network device, the BFR-Nbr information is the first IP address. In another possible implementation of the second network device, a bit index routing table (bit index routing table, BIRT) of the second network device includes a BFR ID of at least one BFR in an outside area and BFR-prefix information corresponding to the at least one BFR, where the BFR-prefix information is the first IP address.

Optionally, in this embodiment of this application, the second network device may determine, based on Table 1, that a BFR-Nbr to which the BIER packet needs to be sent is the first network device; encapsulate the BIER header of the BIER packet based on BIER encapsulation information, in Table 2, corresponding to the BFR-Nbr that is the first network device; and send an encapsulated BIER packet to the first network device. Alternatively, the second network device may determine, based on Table 3, that a BFR-Nbr to which the BIER packet needs to be sent is the first network device; encapsulate the BIER header of the BIER packet based on BIER encapsulation information corresponding to the first network device in Table 3; and send an encapsulated BIER packet to the first network device.

It should be noted that if the BFR-Nbr is the first network device, the first network device is a next-hop BFR neighbor directly connected to the second network device, and the encapsulated BIER packet may be sent directly to the first network device. If the first network device is a next-hop BFR neighbor non-directly connected to the second network device, the encapsulated BIER packet may be sent from the second network device to the first network device by using a tunnel between the first network device and the second network device.

Figure 7:
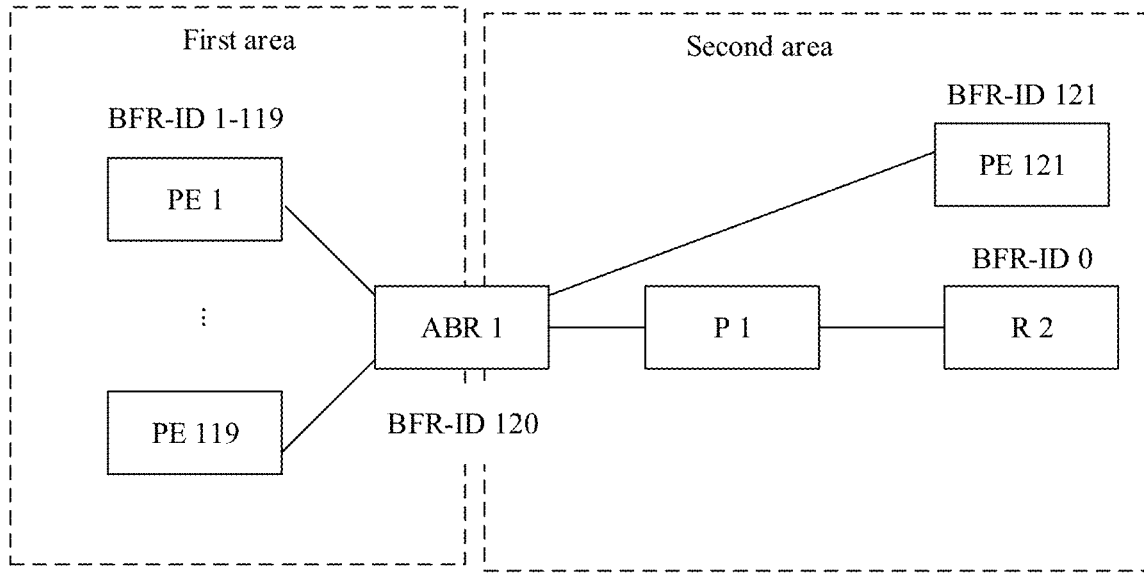
FIG. 7 is a network architecture for BIER forwarding entry construction according to an embodiment of this application.

For ease of description of the BIER forwarding entry construction method provided in this embodiment of this application, the following provides descriptions with reference to a network architecture shown in FIG. 7. It should be understood that the network architecture shown in FIG. 7 is merely intended to help a person skilled in the art understand the embodiments of this application, instead of limiting the embodiments of this application to a specific value or a specific scenario shown in the example. It is clear that a person skilled in the art can make various equivalent modifications or changes based on the provided network architecture, and such modifications and changes also fall within the scope of the embodiments of this application.

FIG. 7 is a network architecture for BIER forwarding entry construction according to an embodiment of this application. Referring to FIG. 7, a first area and a second area may be included. The first area includes an ABR 1 and at least one provider edge (PE). In FIG. 7, as an example for description, the first area includes a PE 1 to a PE 119. The second area includes an ABR 1, an R 2, a P 1, and a PE 121.

In the first area, the ABR 1 corresponds to the foregoing first network device, and may also serve as an edge BFR for which a BFR-ID is configured. For example, the BFR-ID is set to 120. The PE 1 to the PE 119 serve as edge BFRs in the first area and correspond to the at least one third network device above.

In the second area, for example, the PE 121 is a BFR in the second area and corresponds to the second network device, and may also serve as an edge BFR for which a BFR-ID is configured. For example, the BFR-ID is set to 121. For another example, the R 2 serves as a BFR in the second area and corresponds to the second network device above. The R 2 may serve as an edge BFR in the second area, or may serve as a BFR for performing intermediate forwarding of a BIER packet in the second area. If the R 2 is a BFR for performing intermediate forwarding of a BIER packet, a BFR-ID corresponding to the R 2 is 0. The P 1 serves as a network device that does not support BIER forwarding (a non-BIER network device) in the second area.

In the first area, a BFR ID is configured for each edge BFR. For example, BFR IDs 1 to 120 of a plurality of BFRs may be flooded in the first area by using the IGP, so that BFRs in the first area construct a BIFT entry for guiding forwarding of an original multicast data packet in the first area. When receiving a BIER packet encapsulated with a BIER header, the BFRs in the first area may forward, in the first area, the BIER packet to a destination node based on the BIFT entry.

In the second area, a BFR ID is configured for each edge BFR. For example, BFR IDs configured for the edge BFRs in the second area are 120 and 121. The BFR IDs may be flooded in the second area by using the IGP, so that BFRs in the second area construct a BIFT entry for guiding forwarding of an original multicast data packet in the second area. When receiving a BIER packet encapsulated with a BIER header, the BFRs in the second area may forward, in the second area, the BIER packet to a destination node based on the BIFT entry.

According to the BIER forwarding entry construction method provided in the embodiments of this application, a BIER forwarding entry is constructed across areas, thereby implementing BIER packet forwarding across areas. Specifically, the BFR-IDs (which are respectively 1 to 120) in the first area may be flooded to the second area, so that the BFRs in the second area construct a BIFT entry based on the BFR-IDs (which are respectively 1 to 120) in the first area, and send a BIER packet from the second area to each BFR in the first area based on the BIFT entry. Alternatively, the BFR-IDs (which are respectively 120 and 121) in the second area may be flooded to the first area, so that the BFRs in the first area construct a BIFT entry based on the BFR-IDs (which are respectively 120 and 121) in the first area, and send a BIER packet from the first area to each BFR in the second area based on the BIFT entry.

Figure 8:
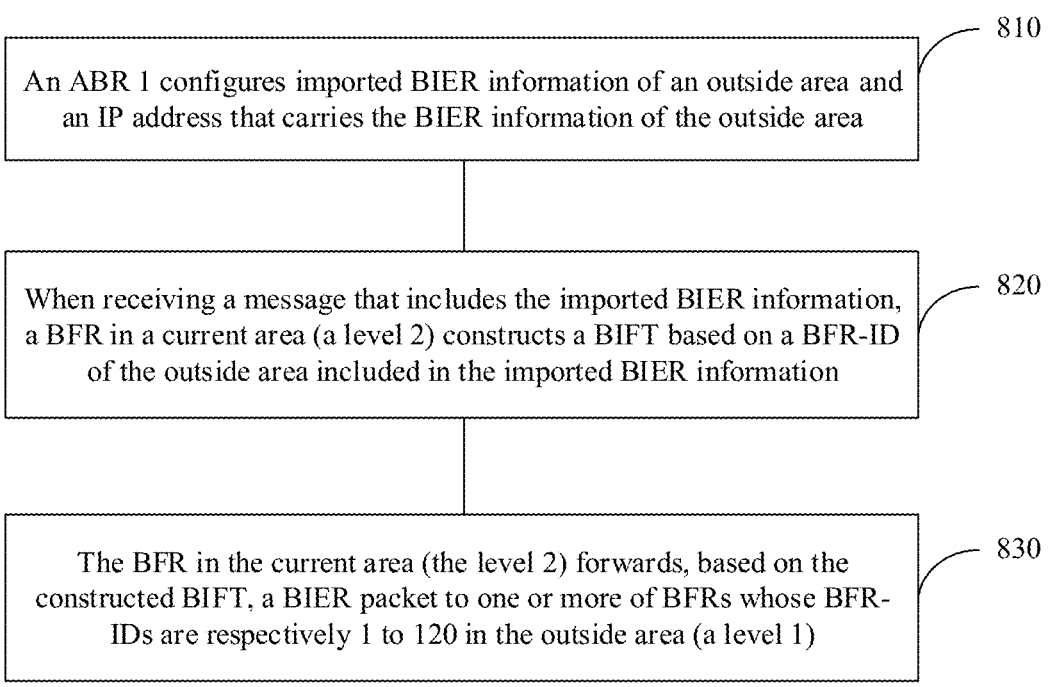
FIG. 8 is a schematic flowchart of a cross-area BIER packet forwarding method according to an embodiment of this application.

The following describes in detail a specific process of cross-area BIER packet forwarding with reference to FIG. 8 by using an example in which a first area is a level 1 in an IS-IS protocol and a second area is a level 2 in the IS-IS protocol. It should be noted that examples in FIG. 8 are merely intended to help a person skilled in the art understand the embodiments of this application, instead of limiting the embodiments of this application to a specific value or a specific scenario shown in the examples. It is clear that a person skilled in the art can perform various equivalent modifications or changes based on the examples provided in FIG. 8, and such modifications and changes also fall within the scope of the embodiments of this application.

FIG. 8 is a schematic flowchart of another cross-area BIER packet forwarding method according to an embodiment of this application. Referring to in FIG. 8, the method may include steps 810 to 830. The following separately describes the steps 810 to 830 in detail.

Step 810: An ABR 1 configures imported BIER information of an outside area and an IP address that carries the BIER information of the outside area.

For example, the ABR 1 is configured to carry and import the BIER information of the outside area by using a first message. The first message includes a host routing prefix of the ABR 1. A specific configuration is as follows:

```
    interface loopback0
    ip addr 1.1.1.1 32 ##Host routing prefix of the ABR 1
  BIER
    sub-domain 0
      BFR-ID 120 ##BFR-ID 120 of the ABR 1
      protocol isis 1 bfr-prefix loopback0
      encapsulation mpls bsl 256 max-si 2 ##Configure encapsulation information,
that is, a BIFT-id, of the ABR 1
      import bfr-id 1 to 119 into isis level-2 ##Import BIER information of an
outside area (a level 1) into a level 2
      import bfr-id 121 into isis level-1 ##Import BIER information of an outside area
(the level 2) into the level 1
```

In the configuration, "interface loopback0 Ip addr 1.1.1.1 32" may be used to represent that routing prefix information is constructed by using an IP address of a loopback0 address (1.1.1.1) of the ABR 1. The IP address 1.1.1.1 is a 32-bit mask and can serve as the host routing prefix. "protocol isis 1 bfr-prefix loopback0" represents that routing prefix information is constructed by using the IP address of loopback0 and BIER information is flooded by using an IS-IS protocol. "encapsulation mpls bsl 256 max-si 2" represents the encapsulation information of the ABR 1. For example, the ABR 1 generates, based on the configuration, a BIFT-id value or an MPLS label corresponding to an SD/BSL/SI. The BIFT-id determines a combination including an SD to which a BIER packet belongs, a used BSL, and an SI of the BSL to which the packet belongs. "import bfr-id 1 to 119 into isis level-2" represents that BFR IDs 1 to 119 of BFRs in an outside area (the level 1) are flooded to a current area (the level 2). "import bfr-id 121 into isis level-1" represents that a BFR-ID 121 in an outside area (the level 2) is flooded to a current area (the level 1).

A BIFT ID (which is a label in MPLS encapsulation) is a start label of a label block from a minimum SI (SI=0) to a maximum SI (SI=Max SI) with the same BSL. For example, when the BSL is 256, information about three sets in which SIs are equal to 0, 1, and 2 exists. Then, a BIFT-id represents a label <SD=X, BSL=256, SI=0>. By adding 1 to a value of the label, a label <SD=X, BSL=256, SI=1> is obtained; and by adding 2 to the value of the label, a label <SD=X, BSL=256, SI=2> is obtained.

In addition to publishing a host route that carries BIER information, the ABR 1 may further publish a segment route, for example, may also publish a host route 1.1.1.1, a segment route 192.168.1.0/24, and a segment route 192.168.2.0/24. The host route carries BIER information, but the segment routes do not carry BIER information, and these prefixes do not overlap with each other.

In addition to publishing a host route that carries BIER information, the ABR 1 may further publish a default route, for example, may also publish a host route 1.1.1.1 and a default route 0.0.0.0/0. The host route carries BIER information, but the default route does not carry BIER information, and these routes overlap with each other.

Figure 9:
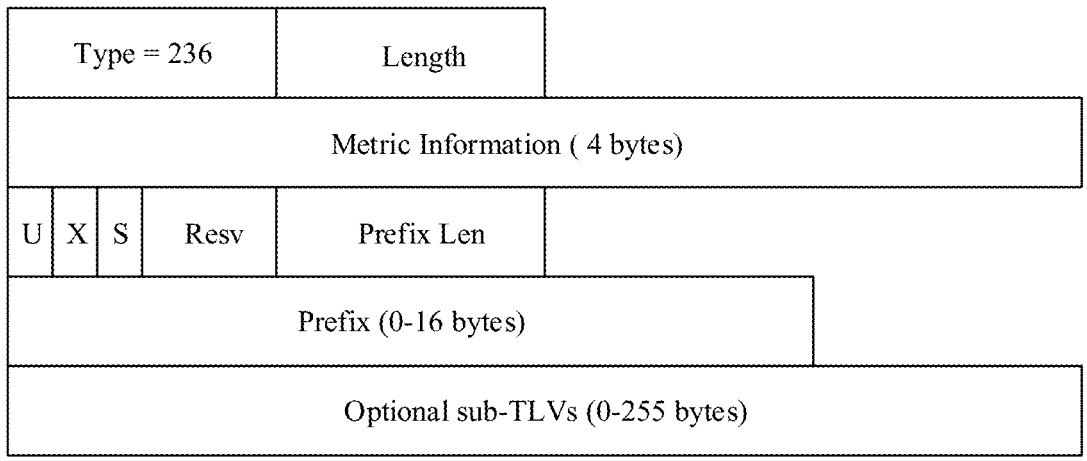
FIG. 9 is a schematic block diagram of a TLV format according to an embodiment of this application.

The following uses an example in which a current area of the ABR 1 is a level 2, and a level 1 is an outside area. The ABR 1 may flood, based on the foregoing configuration, the BIER information of the outside area (the level 1) to the current area (the level 2) by using the first message. The first message further includes the host routing prefix of the ABR 1. FIG. 9 is a possible packet format of the first message.

Referring to FIG. 9, the packet format is a possible type length value (TLV) format. Different type values in the TLV indicate host routing prefixes of different types of IP addresses, and a prefix field indicates a corresponding IP address. For example, type=236 in FIG. 9 may represent an IPv6 host routing prefix, and the prefix field may be a 16-byte IPv6 address. It should be noted that the type may alternatively be another value. For example, type=237 may also represent an IPv6 host routing prefix, and the prefix field may be a 16-byte IPv6 address. For another example, type=135/235 represents an IPv4 host routing prefix, and the prefix field may be a 4-byte IPv4 address.

Figure 10:
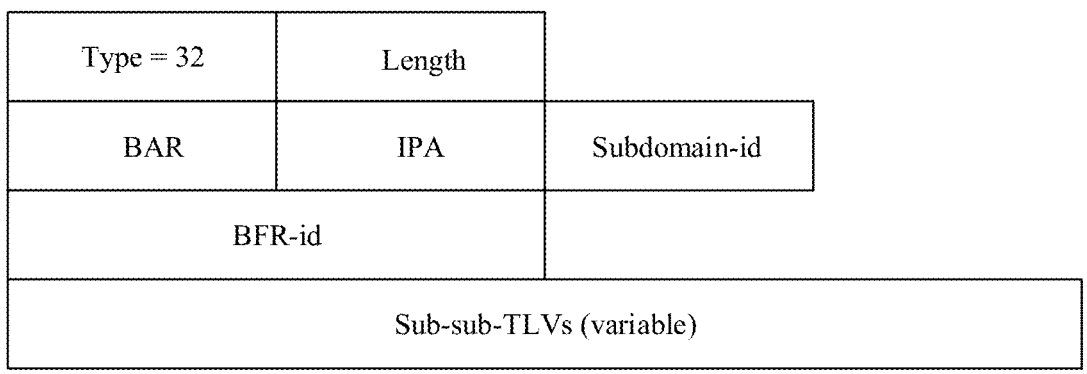
FIG. 10 is a schematic block diagram of a sub-TLV according to an embodiment of this application.

A host routing prefix may include one or more BIER sub-domains. Therefore, the TLV in FIG. 9 may include one or more optional sub-TLVs. The sub-TLV may indicate BIER information of the ABR 1. For a specific sub-TLV related packet format, refer to FIG. 10. In FIG. 10, type=32 represents BIER information of the ABR 1. The BIER information may include one or more attributes of a sub-domain, for example, a BFR-ID of the ABR 1 in the sub-domain, an interior gateway protocol (IGP) algorithm used by the sub-domain, and a BIER path algorithm. The BIER information of the ABR 1 shown in FIG. 10 further includes encapsulation information of each sub-domain, for example, a sub-sub-TLV in FIG. 10. The sub-sub-TLV may include encapsulation information of the ABR 1 in the same sub-domain, and may further include encapsulation information of a PE 1 to a PE 119 in the outside area (the level 1). The following describes a format of the sub-sub-TLV in detail with reference to FIG. 11 and FIG. 12.

Figure 11:
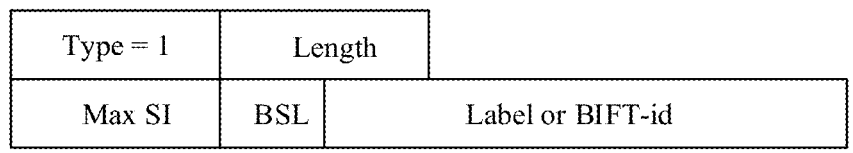
FIG. 11 is a schematic block diagram of a sub-sub-TLV according to an embodiment of this application.

Referring to FIG. 11, type=1 in a TLV may represent BSL-related encapsulation information of the ABR 1. For example, encapsulation information in which BSL=256 may exist in a sub-domain 0. A BIFT ID (which is a label in MPLS encapsulation) is a start label of a label block from a minimum SI (SI=0) to a maximum SI (SI=Max SI) with the same BSL. For example, when the BSL is 256, information about three sets in which SIs are equal to 0, 1, and 2 exists. Then, a BIFT-id represents a label <SD=X, BSL=256, SI=0>. By adding 1 to a value of the label, a label <SD=X, BSL=256, SI=1> is obtained; and by adding 2 to the value of the label, a label <SD=X, BSL=256, SI=2> is obtained.

It should be noted that a type value in the sub-sub-TLV is related to a BIER encapsulation format. The type value in the sub-sub-TLV may vary with different encapsulation formats. The BIER encapsulation format is not specifically limited in this embodiment of this application, and may be BIERv6 encapsulation or may be BIER-ethernet (Ethernet, ETH) encapsulation.

Figure 12:
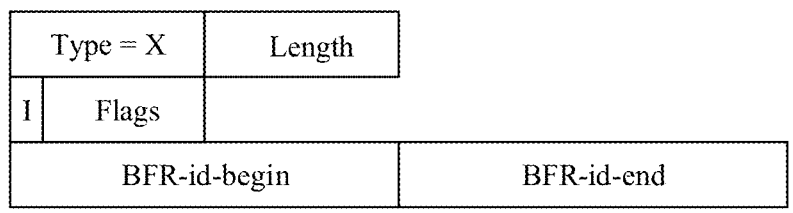
FIG. 12 is a schematic block diagram of another sub-sub-TLV according to an embodiment of this application.

Referring to FIG. 12, type=X in a TLV represents imported BIER information of an outside area (a level 1). The information is also represented by using a TLV format and is also a sub-sub-TLV located in a sub-domain. The BIER information includes imported BFR-ID information of a BFR in the outside area (the level 1). For example, two fields BFR-ID-begin and BFR-ID-end are used to represent a range of imported BFR-IDs of BFRs in the outside area (the level 1). For example, BFR-ID-begin and BFR-ID-end of the sub-sub-TLV that are carried in BIER information of the outside area (the level 1) published from the ABR 1 to a current area (a level 2) are respectively 1 and 119.

Optionally, a TLV format shown in FIG. 12 may further indicate that the BIER information is imported BIER information of the outside area (the level 1). There are a plurality of specific representation forms. In a possible implementation, the TLV format includes an indication sign "I". The indication sign "I" represents "import", indicating that the BIER information is imported BIER information of the BFRs in the outside area (the level 1). In another possible implementation, a type value in the TLV format may be used to implicitly indicate that the BIER information is imported BIER information of the BFRs in the outside area (the level 1).

Step 820: When receiving a message that includes the imported BIER information, a BFR in a current area (the level 2) constructs a BIFT entry based on a BFR-ID of the outside area included in the imported BIER information.

An R 2 or a PE 121 in the current area (the level 2) receives the first message flooded by the ABR 1. The first message flooded by the ABR 1 includes the host routing prefix and the BFR-ID 120 of the ABR 1, and also includes imported BFR-IDs 1 to 119 of 119 BFRs. The R 2 or the PE 121 may construct a BIFT entry based on information such as the BIFT-ID of the ABR 1 and the imported BFR-IDs 1 to 119.

For example, a next-hop BFR neighbor of the R 2 to the BFRs whose BFR-IDs are respectively 1 to 120 in the outside area (the level 1) is the ABR 1. The BIFT entry constructed by the R 2 according to the foregoing method is shown as follows:
  (BFR-Nbr=ABR 1, FBM=BFR-ID<1 to 120>, BIFT-id<SD=X, BSL=256, SI=0>)

For example, a next-hop BFR neighbor of the PE 121 to the BFRs whose BFR-IDs are respectively 1 to 120 in the outside area (the level 1) is the ABR 1. The BIFT entry constructed by the PE 121 according to the foregoing method is shown as follows:
  (BFR-Nbr=ABR 1, FBM=BFR-ID<1 to 120>, BIFT-id<SD=X, BSL=256, SI=0>)

Step 830: The BFR in the current area (the level 2) forwards, based on the constructed BIFT entry, a BIER packet to one or more of the BFRs whose BFR-IDs are respectively 1 to 120 in the outside area (the level 1).

For example, a next-hop BFR neighbor of the PE 121 to the BFRs whose BFR-IDs are respectively 1 to 120 is the ABR 1. A BIFT entry constructed by the PE 121 is shown in Table 1:
  Table 1: (BFR-Nbr=ABR 1, FBM=BFR-ID<1 to 120>, BIFT-id≤SD=X, BSL=256, SI=0>)

The BIFT entry is used to represent that when any one of the 1st bit to the 120th bit from right to left in a bit string of the BIER packet is 1, the BIER packet is sent from the PE 121 to the BFR neighbor ABR 1.

Optionally, the constructed BIFT entry may further include BIER encapsulation information, that is, a BIFT-id, of the ABR 1. In BIER-MPLS encapsulation, a BIFT-id is an MPLS label value and corresponds to a combination of SD/BSL/SI.

When the BIER packet is sent from the PE 121 to the one or more of the BFRs whose BFR-IDs are respectively 1 to 120, it is necessary to determine, based on Table 1, that a BFR-Nbr to which the BIER packet needs to be sent is the ABR 1. The ABR 1 is a next-hop BFR neighbor directly connected to the PE 121. Therefore, the PE 121 may encapsulate, based on <SD=X, BSL=256, SI=0> corresponding to the BIFT-id, the BIER encapsulation information <SD=X, BSL=256, SI=0> of the ABR 1 into a BIFT ID field of a BIER header, and send the BIER packet to the ABR 1. After receiving the BIER packet, the ABR 1 may send, based on a BIFT entry constructed by the ABR 1, the BIER packet to the one or more of the BFRs whose BFR-IDs are respectively 1 to 120. A specific process in which the ABR 1 constructs the BIFT entry is similar to the foregoing method. For details, refer to the foregoing descriptions. Details are not described herein again.

For example, a next-hop BFR neighbor of the R 2 to the BFRs whose BFR-IDs are respectively 1 to 120 is the ABR 1. A BIFT entry constructed by the R 2 is shown in Table 2:
  (BFR-Nbr=ABR 1, FBM=BFR-ID<1 to 120>, BIFT-id≤SD=X, BSL=256, SI=0>)

The BIFT entry is used to represent that when any one of the 1st bit to the 120th bit from right to left in a bit string of the BIER packet is 1, the BIER packet is sent from the R 2 to the BFR neighbor ABR 1.

Optionally, the constructed BIFT entry may further include BIER encapsulation information, that is, a BIFT-id, of the ABR 1. In BIER-MPLS encapsulation, a BIFT-id is an MPLS label value and corresponds to a combination of SD/BSL/SI.

When the BIER packet is sent from the R 2 to one or more of the BFRs whose BFR-IDs are respectively 1 to 120, it is necessary to determine, based on Table 1, that a BFR-Nbr to which the BIER packet needs to be sent is the ABR 1. The R 2 then encapsulates, based on <SD=X, BSL=256, SI=0> corresponding to the BIFT-id, the BIER encapsulation information <SD=X, BSL=256, SI=0> of the ABR 1 into a BIFT ID field of a BIER header. The ABR 1 is a next-hop BFR neighbor non-directly connected to the R 2; in other words, a P 1 that does not support BIER forwarding exists between the R 2 and the ABR 1. Therefore, the R 2 cannot send an encapsulated BIER packet directly to the ABR, and further needs to obtain unicast tunnel information of the non-directly connected neighbor ABR 1 based on the host routing prefix flooded by the ABR 1 and send the BIER packet of the R 2 to the ABR 1 based on the unicast tunnel information. Therefore, the foregoing BIFT entry may further include the unicast tunnel information.

The unicast tunnel information is related to an encapsulation type. The unicast tunnel information is not specifically limited in this embodiment of this application. The following describes the unicast tunnel information in detail separately by using BIER-MPLS encapsulation and BIERv6 encapsulation as examples.

A packet encapsulated based on BIER-MPLS may use an MPLS tunnel as a unicast tunnel. The BIFT entry includes encapsulation information corresponding to the MPLS tunnel. For example, BIER-MPLS is deployed in an SR-MPLS network. The unicast tunnel information may be a segment routing global block (SRGB) label corresponding to the host routing prefix of the ABR 1.

Specifically, the SRGB label corresponding to the host routing prefix of the ABR 1 may be configured on the ABR 1. A possible configuration is shown as follows:

```
interface loopback0
    ip addr 1.1.1.1 32 ##Host routing prefix of the ABR 1
ISIS enable
    ISIS prefix-sid absolute 12345
BIER
sub-domain 0
    BFR-ID 120 ##BFR-ID 120 of the ABR 1
    protocol isis 1 bfr-prefix loopback0
    encapsulation mpls bsl 256 max-si 2 ##Configure encapsulation information,
that is, a BIFT-id, of the ABR 1
    import bfr-id 1 to 119 into isis level-2 ##Import BIER information of an
outside area (the level 1) into the level 2
    import bfr-id 121 into isis level-1 ##Import BIER information of an outside area
(the level 2) into the level 1
```

In the configuration, "ISIS prefix-sid absolute 12345" is used to represent that the SRGB label corresponding to the host routing prefix 1.1.1.1 of the ABR 1 is set to 12345.

In this embodiment of this application, the unicast tunnel information is the SRGB label 12345. The R 2 may find a unicast tunnel to the ABR 1 based on the unicast tunnel information, which is the SRGB label 12345, included in the BIFT entry. The R 2 sends the BIER packet to the ABR 1 through the unicast tunnel based on the foregoing BIFT entry constructed by the R 2. After receiving the BIER packet, the ABR 1 may send, based on the BIFT entry constructed by the ABR 1, the BIER packet to the one or more of the BFRs whose BFR-IDs are respectively 1 to 120.

For example, BIERv6 is deployed in an SRv6 network. The unicast tunnel information may be an IPv6 tunnel corresponding to the host routing prefix of the ABR 1. The IPv6 tunnel may be an IPv6 address on the ABR 1, for example, an IPv6 address with an identifier of End.BIER.

When the R 2 sends an encapsulated IPv6 packet to the ABR 1, an IPv6 address whose identifier is End.BIER and that is in the routing prefix sent by the ABR 1 may be encapsulated in an IPv6 destination address. The BIER packet may be sent to the ABR 1 based on the IPv6 address. In this way, when the packet whose destination address is the ABR 1 and that includes the IPv6 address whose identifier is End.BIER is sent from the R 2, a P 2 can send the BIER packet from the R 2 to the ABR 1 based on the IPv6 address whose identifier is End.BIER and that is encapsulated in the BIER packet, without a need to support BIERv6 packet forwarding.

Specifically, the IPv6 address whose identifier is End.BIER may be configured on the ABR 1. For example, the ABR 1 is configured to carry and import BIER information of an outside area by using a first message. The first message includes the IPv6 address that is of the ABR 1 and whose identifier is End.BIER. A possible configuration is as follows:

```
interface loopback0
    ipv6 addr 2001:DB1:1::AB37 128 End.BIER ##Configure an IPv6 address with a
128-bit mask;
    ISIS ipv6 enable
BIER
```

```
sub-domain 0
    BFR-ID 120 ##BFR-ID of the ABR 1
    protocol isis 1 bfr-prefix loopback0
    encapsulation mpls bsl 256 max-si 2 ##Configure encapsulation information,
that is, a BIFT-id, of the ABR 1
    import bfr-id 1 to 119 into isis level-2 ##Import BIER information of an
outside area (the level 1) into the level 2
    import bfr-id 121 into isis level-1 ##Import BIER information of an outside area
(the level 2) into the level 1 for publishing
```

In the configuration, "ipv6 addr 2001:DB1:1::AB37 128 End.BIER" represents that a loopback0 address of the ABR 1 is set to an IPv6 address 2001:DB1:1::AB37 with a 128-bit mask and an identifier of End.BIER.

In this embodiment of this application, the unicast tunnel information is the IPv6 address 2001:DB1:1::AB37 with the identifier of End.BIER. The R 2 may find a unicast tunnel to the ABR 1 based on the unicast tunnel information, which is the IPv6 address 2001:DB1:1::AB37, included in the BIFT entry. The R 2 sends, to the ABR 1 by using the unicast tunnel based on the BIFT entry, the BIER packet that is to be sent to the one or more of the BFRs whose BFR-IDs are respectively 1 to 120.

Optionally, alternatively, a current area of the ABR 1 may be the level 1, and an outside area may be the level 2. The ABR 1 may flood and carry, based on the configuration in step 810, the host routing prefix of the ABR 1 and the BIER information of the outside area (the level 2) to the current area (the level 1) by using the first message sent by the ABR 1. The first message further includes BIER information of the ABR 1. Specifically, the first message includes a BFR-ID 121 and a BFR-ID 120, and is flooded to the current area (the level 1). A BFR in the current area (the level 1) constructs a BIFT entry to BFRs whose IDs are respectively 120 and 121, so that BFRs whose BFR-IDs are respectively 1 to 120 in the current area (the level 1) may forward, based on the BIFT entry, a BIER packet to one or both of the BFRs whose IDs are respectively 120 and 121 in the outside area (the level 2). A specific process of constructing the BIFT entry and performing forwarding is similar to the process, in FIG. 8, of forwarding the BIER packet in the level 2 to the one or more of the BFRs whose BFR-IDs are respectively 1 to 120 in the level 1. For details, refer to the descriptions of FIG. 8. Details are not described herein again.

By using the foregoing technical solution, a BIER packet can be forwarded across different areas of the same protocol.

Figure 13:
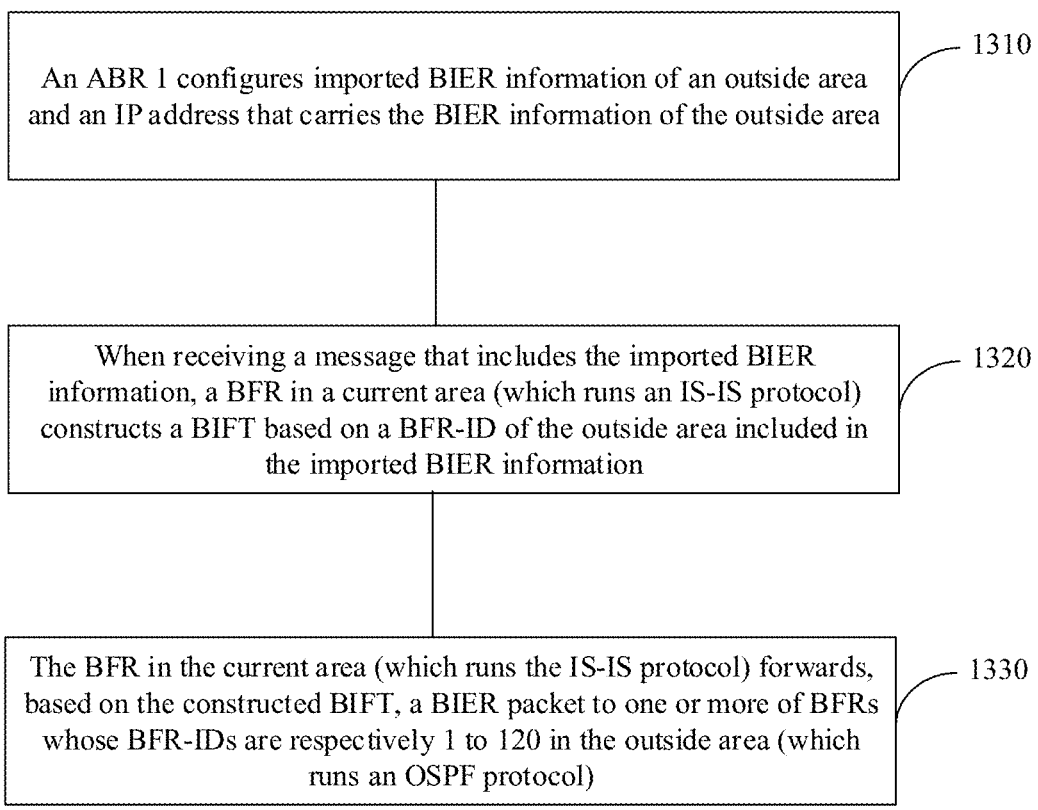
FIG. 13 is a schematic flowchart of another cross-area BIER packet forwarding method according to an embodiment of this application.

The following describes in detail a specific process of cross-area BIER packet forwarding with reference to FIG. 13 by using an example in which a first area runs an OSPF protocol and a second area runs an IS-IS protocol. It should be noted that examples in FIG. 13 are merely intended to help a person skilled in the art understand the embodiments of this application, instead of limiting the embodiments of this application to a specific value or a specific scenario shown in the examples. It is clear that a person skilled in the art can perform various equivalent modifications or changes based on the example provided in FIG. 13, and such modifications and changes also fall within the scope of the embodiments of this application.

FIG. 13 is a schematic flowchart of another cross-area BIER packet forwarding method according to an embodiment of this application. Referring to FIG. 13, the method may include steps 1310 to 1330. The following separately describes steps 1310 to 1330 in detail.

It should be understood that in the embodiment shown in FIG. 13, the OSPF protocol is used between the PE 1 to the PE 119 and the ABR 1 in FIG. 7, and the IS-IS protocol is used between the ABR 1 and the R 2 and the P 1. In this embodiment, an interface on a router can run both IS-IS and OSPF. In other words, both IS-IS and OSPF can be enabled on loopback0 on the ABR 1.

Step 1310: An ABR 1 configures imported BIER information of an outside area and an IP address that carries the BIER information of the outside area.

For example, the ABR 1 is configured to carry and import the BIER information of the outside area by using a first message. The first message includes a host routing prefix of the ABR 1. A specific configuration is as follows:

```
interface loopback0
    ip addr 1.1.1.1 32 ##Host routing prefix of the ABR 1
    OSPF enable
    ISIS enable
BIER
sub-domain 0
    bfr-id 120 ##BFR-ID 120 of the ABR 1
    protocol isis bfr-prefix loopback0
        protocol ospf bfr-prefix loopback0
        encapsulation mpls bsl 256 max-si 2 ##Configure encapsulation information,
that is, a BIFT-id, of the ABR 1
    import bfr-id 1 to 119 into isis ##Import BIER information of an outside area (an
OSPF area) into an IS-IS area for publishing
        import bfr-id 121 into ospf ##Import BIER information of an outside area (the
IS-IS area) into the OSPF area for publishing
```

In the configuration, "protocol isis bfr-prefix loopback0" represents that routing prefix information is constructed by using an IP address of loopback0 and BIER information is flooded by using the IS-IS protocol. "protocol ospf bfr-prefix loopback0" represents that routing prefix information is constructed by using the IP address of loopback0 and BIER information is flooded by using the OSPF protocol. "import bfr-id 1 to 119 into isis" represents that routing prefix information is constructed by using the IP address of loopback0 for BFRs whose BFR IDs are respectively 1 to 119 in an outside area (which runs the OSPF protocol), and the routing prefix information is flooded to a current area (which runs the IS-IS protocol). "import bfr-id 121 into ospf" represents that routing prefix information is constructed by using the IP address of loopback0 of the ABR 1 for a BFR whose BFR-ID is 121 in an outside area (which runs the IS-IS protocol), and the routing prefix information is flooded to a current area (which runs the OSPF protocol).

Step 1320: When receiving a message that includes the imported BIER information, a BFR in a current area (which runs the IS-IS protocol) constructs a BIFT entry based on a BFR-ID of the outside area included in the imported BIER information.

A process is similar to that in step 820. For details, refer to the descriptions in step 820. Details are not described herein again.

Step 1330: The BFR in the current area (which runs the IS-IS protocol) forwards, based on the constructed BIFT entry, a BIER packet to one or more of the BFRs whose BFR-IDs are respectively 1 to 120 in the outside area (which runs the OSPF protocol).

A process is similar to that in step 830. For details, refer to the descriptions in step 830. Details are not described herein again.

Optionally, alternatively, a current area of the ABR 1 may run the OSPF protocol, and an outside area may run the IS-IS protocol. The ABR 1 may flood and carry, based on the configuration in step 1310, the host routing prefix of the ABR 1 and BIER information of the outside area (which runs the IS-IS protocol) to the current area (which runs the OSPF protocol) by using the first message sent by the ABR 1. The first message further includes BIER information of the ABR 1. Specifically, the first message includes a BFR-ID 121 and a BFR-ID 120, and is flooded to the current area (which runs the OSPF protocol). A BFR in the current area (which runs the OSPF protocol) constructs a BIFT entry to BFRs whose IDs are respectively 120 and 121, so that BFRs whose BFR-IDs are respectively 1 to 119 in the current area (which runs the OSPF protocol) may forward, based on the BIFT entry, a BIER packet to one or both of the BFRs whose IDs are respectively 120 and 121 in the outside area (which runs the IS-IS protocol). A specific process of constructing the BIFT entry and performing forwarding is similar to that in FIG. 13. For details, refer to the descriptions of FIG. 13. Details are not described herein again.

By using the foregoing technical solution, a BIER packet can be forwarded across protocols.

Figure 14:
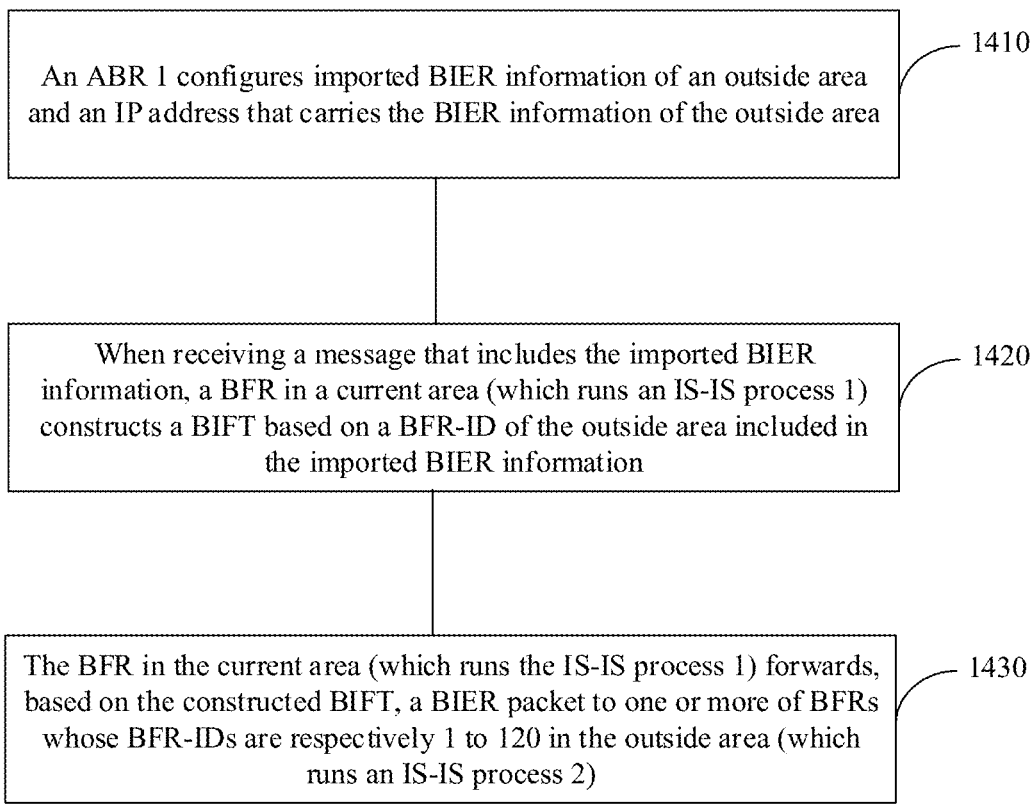
FIG. 14 is a schematic flowchart of another cross-area BIER packet forwarding method according to an embodiment of this application.

The following describes in detail a specific process of cross-area BIER packet forwarding with reference to FIG. 14 by using an example in which a first area runs an IS-IS process 2 and a second area runs an IS-IS process 1. It should be noted that examples in FIG. 14 are merely intended to help a person skilled in the art understand the embodiments of this application, instead of limiting the embodiments of this application to a specific value or a specific scenario shown in the examples. It is clear that a person skilled in the art can perform various equivalent modifications or changes based on the example provided in FIG. 14, and such modifications and changes also fall within the scope of the embodiments of this application.

FIG. 14 is a schematic flowchart of another cross-area BIER packet forwarding method according to an embodiment of this application. Referring to FIG. 14, the method may include steps 1410 to 1430. The following separately describes steps 1410 to 1430 in detail.

It should be understood that in the embodiment shown in FIG. 14, an ABR 1 uses the IS-IS process 2 to flood routing information to the PE 1 to the PE 119 in FIG. 7. In addition, the ABR 1 uses the IS-IS process 1 to flood routing information to the R 2 and the PE 121 in FIG. 7. In this embodiment, one interface of the ABR 1 usually can run only one IS-IS process, and two interfaces need to be configured for two IS-IS processes. Therefore, two interface addresses need to be configured for the ABR 1, which are respectively loopback0 and loopback1.

Step 1410: The ABR 1 configures imported BIER information of an outside area and an IP address that carries the BIER information of the outside area.

For example, the ABR 1 is configured to import the BIER information of the outside area by using a first message. The first message includes a host routing prefix of the ABR 1. A specific configuration is as follows:

```
interface loopback0
    ip addr 1.1.1.1 32 ##Configure a prefix of an interface address (where a 32-bit
mask means a host routing prefix)
    ISIS enable 1
interface loopback1
    ip addr 1.1.1.2 32 ##Configure a prefix of an interface address (where a 32-bit
mask means a host routing prefix)
    ISIS enable 2
BIER
sub-domain 0
    bfr-id 120 ##BFR-ID 120 of the ABR 1
    protocol isis 1 bfr-prefix loopback0 ##BIER information is flooded in the process 1
by using loopback0 of IS-IS
    protocol isis 2 bfr-prefix loopback1 ##BIER information is flooded in the process 2
by using loopback1 of IS-IS
        encapsulation mpls bsl 256 max-si 2 ##Configure encapsulation information,
that is, a BIFT-id, of the ABR 1
    import bfr-id 1 to 119 into isis 1
        import bfr-id 121 to 800 into isis 2
```

In the configuration, "interface loopback0 Ip addr 1.1.1.1 32" represents that an address of loopback0 configured on the ABR 1 is 1.1.1.1. "interface loopback1 Ip addr 1.1.1.2 32" represents that an address of loopback1 configured on the ABR 1 is 1.1.1.2. "protocol isis 1 bfr-prefix loopback0" represents that routing prefix information is constructed by using the IP address of loopback0 and BIER information is flooded in the IS-IS process 1. "protocol isis 2 bfr-prefix loopback1" represents that routing prefix information is constructed by using the IP address of loopback1 and BIER information is flooded in the IS-IS process 2. "import bfr-id 1 to 119 into isis 1" represents that routing prefix information is constructed, by using the IP address of loopback1 in the host routing prefix, for BFRs whose BFR IDs are respectively 1 to 119 in the IS-IS process 2, and the routing prefix information is flooded to the IS-IS process 1. "import bfr-id 121 into isis 2" represents that routing prefix information is constructed, by using the IP address of loopback1 in the host routing prefix, for BFRs whose BFR IDs are respectively 1 to 119 in the IS-IS process 1, and the routing prefix information is flooded to the IS-IS process 2.

Step 1420: When receiving a message that includes the imported BIER information, a BFR in a current area (which runs the IS-IS process 1) constructs a BIFT entry based on a BFR-ID of the outside area included in the imported BIER information.

A process is similar to that in step 820. For details, refer to the descriptions in step 820. Details are not described herein again.

Step 1430: The BFR in the current area (which runs the IS-IS process 1) forwards, based on the constructed BIFT entry, a BIER packet to one or more of BFRs whose BFR-IDs are respectively 1 to 120 in the outside area (which runs the IS-IS process 2).

A process is similar to that in step 830. For details, refer to the descriptions in step 830. Details are not described herein again.

Optionally, alternatively, a current area of the ABR 1 may run the IS-IS process 2, and an outside area may run the IS-IS process 1. The ABR 1 may flood and carry, based on the configuration in step 1410, the host routing prefix of the ABR 1 and BIER information of the outside area (which runs the IS-IS process 1) to the current area (which runs the IS-IS process 2) by using the first message sent by the ABR 1. The first message further includes BIER information of the ABR 1. Specifically, the first message includes a BFR-ID 121 and a BFR-ID 120, and is flooded to the current area (which runs the IS-IS process 2). A BFR in the current area (which runs the IS-IS process 2) constructs a BIFT entry to BFRs whose IDs are respectively 120 and 121, so that BFRs whose BFR-IDs are respectively 1 to 119 in the current area (which runs the IS-IS process 2) may forward, based on the BIFT entry, a BIER packet to one or both of the BFRs whose IDs are respectively 120 and 121 in the outside area (which runs the IS-IS process 1). A specific process of constructing the BIFT entry and performing forwarding is similar to that in FIG. 13. For details, refer to the descriptions of FIG. 13. Details are not described herein again.

By using the foregoing technical solution, a BIER packet can be forwarded across processes.

Figure 15:
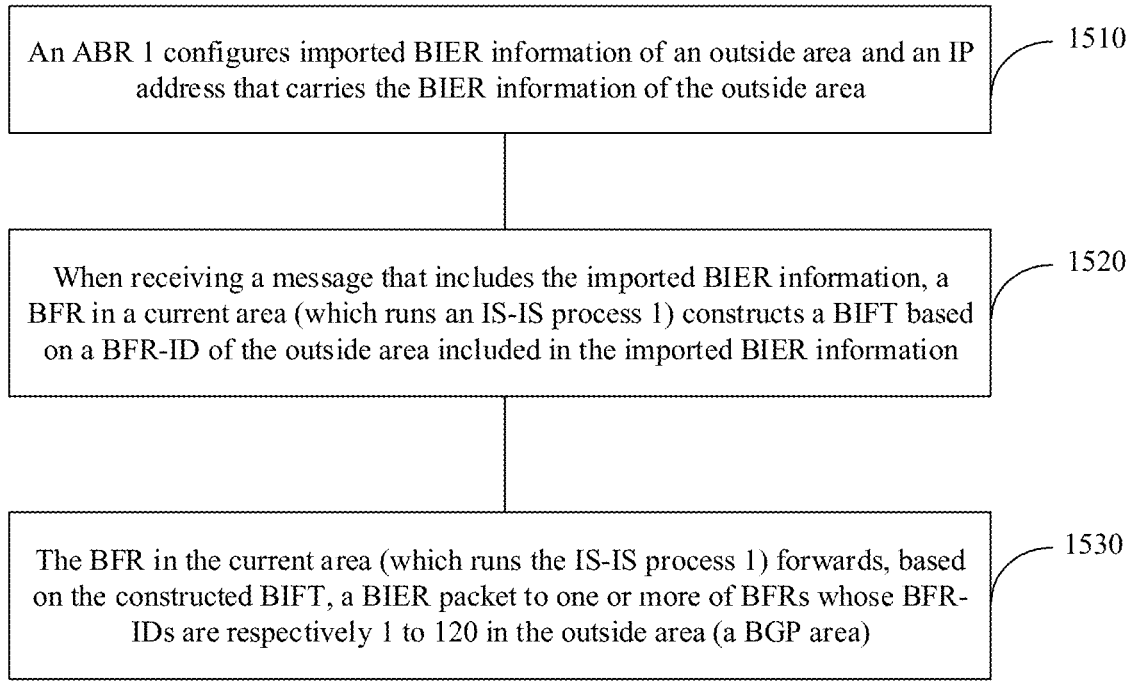
FIG. 15 is a schematic flowchart of another cross-area BIER packet forwarding method according to an embodiment of this application.

The following describes in detail a specific process of cross-area BIER packet forwarding with reference to FIG. 15 by using an example in which a first area is a BGP area and a second area runs an IS-IS process 1. It should be noted that examples in FIG. 15 are merely intended to help a person skilled in the art understand the embodiments of this application, instead of limiting the embodiments of this application to a specific value or a specific scenario shown in the examples. It is clear that a person skilled in the art can perform various equivalent modifications or changes based on the example provided in FIG. 15, and such modifications and changes also fall within the scope of the embodiments of this application.

FIG. 15 is a schematic flowchart of another cross-area BIER packet forwarding method according to an embodiment of this application. Referring to FIG. 15, the method may include steps 1510 to 1530. The following separately describes steps 1510 to 1530 in detail.

It should be understood that in the embodiment shown in FIG. 15, an ABR 1 runs the BGP protocol to flood routing information to the PE 1 to the PE 119 in FIG. 7. In addition, the ABR 1 uses the IS-IS process 1 to flood routing information to the R 2, the PE 121, and the P 1 in FIG. 7. In this embodiment, two interface addresses are configured for the ABR 1, which are respectively loopback0 and loopback1. The ABR 1 uses loopback1 to publish BIER information by using BGP, and the ABR 1 uses loopback0 to publish BIER information by using IS-IS.

Step 1510: The ABR 1 configures imported BIER information of an outside area and an IP address that carries the BIER information of the outside area.

For example, the ABR 1 is configured to carry and import the BIER information of the outside area by using a first message. The first message includes a host routing prefix of the ABR 1. A specific configuration is as follows:

```
interface loopback0
    ip addr 1.1.1.1 32 ##Configure a prefix of an interface address (where a 32-bit
mask means a host routing prefix)
    isis enable 1
interface loopback1
    ip addr 1.1.1.2 32 ##Configure a prefix of an interface address (where a 32-bit
mask means a host routing prefix)
    Isis enable 2
BIER
sub-domain 0
    bfr-id 120 ##BFR-ID 120 of the ABR 1
    protocol isis 1 bfr-prefix loopback0 ##BIER information is flooded in the process 1
by using loopback0 of IS-IS
    protocol bgp bfr-prefix loopback1 ## BIER information is published by using
loopback1 in BGP
        encapsulation mpls bsl 256 max-si 2 ##Configure encapsulation information,
that is, a BIFT-id, of the ABR 1;
    import bfr-id 1 to 119 into isis 1
```

In the configuration, "interface loopback0 Ip addr 1.1.1.1 32" represents that an address of loopback0 configured on the ABR 1 is 1.1.1.1. "interface loopback1 Ip addr 1.1.1.2 32" represents that an address of loopback1 configured on the ABR 1 is 1.1.1.2. "protocol isis 1 bfr-prefix loopback0" represents that routing prefix information is constructed by using the IP address of loopback0 and BIER information is flooded in the IS-IS process 1. "protocol bgp" represents that routing prefix information is constructed by using the IP address of loopback1 and BIER information is flooded in the BGP area. "import bfr-id 1 to 119 into isis 1" represents that routing prefix information is constructed, by using the IP address of loopback1 in the host routing prefix, for BFRs whose BFR IDs are respectively 1 to 119 in an outside area (the BGP area), and the routing prefix information is flooded to a current area (which runs the IS-IS process 1).

Step 1520: When receiving a message that includes the imported BIER information, a BFR in a current area (which runs the IS-IS process 1) constructs a BIFT entry based on a BFR-ID of the outside area included in the imported BIER information.

A process is similar to that in step 820. For details, refer to the descriptions in step 820. Details are not described herein again.

Step 1530: The BFR in the current area (which runs the IS-IS process 1) forwards, based on the constructed BIFT entry, a BIER packet to one or more of BFRs whose BFR-IDs are respectively 1 to 120 in the outside area (the BGP area).

A process is similar to that in step 830. For details, refer to the descriptions in step 830. Details are not described herein again.

By using the foregoing technical solution, a BIER packet can be forwarded across AS domains.

The foregoing describes in detail the methods provided in the embodiments of this application with reference to FIG. 1 to FIG. 15. The following describes in detail apparatus embodiments of this application with reference to FIG. 16 to FIG. 21. It should be understood that the descriptions of the method embodiments correspond to descriptions of the apparatus embodiments. Therefore, for parts that are not described in detail, refer to the foregoing method embodiments.

Figure 16:
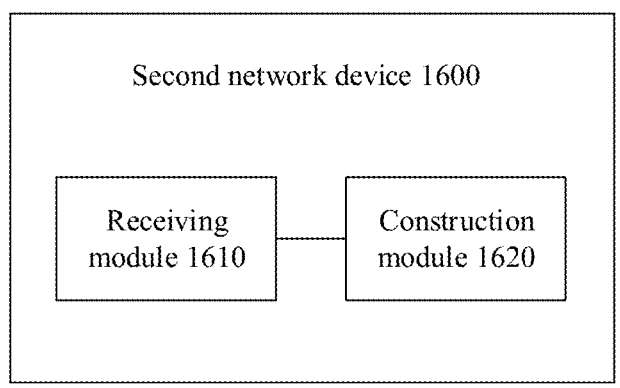
FIG. 16 is a schematic diagram of a structure of a second network device 1600 according to an embodiment of this application.

FIG. 16 is a schematic diagram of a structure of a second network device 1600 according to an embodiment of this application. The second network device 1600 may include:
 a receiving module 1610, configured to receive a first message sent by a first network device, where the first message includes a host routing prefix of the first network device, first BIER information, and second BIER information, the first BIER information includes a bit index forwarding table identifier (BIFT ID) of the first network device, the second BIER information includes a bit-forwarding router identifier (BFR ID) of at least one bit-forwarding router (BFR) in a first area, the at least one BFR does not include the first network device, the first network device belongs to the first area and a second area, the second network device belongs to the second area, and the first area and the second area are different; and
 a construction module 1620, configured to construct a BIER forwarding entry based on the first BIER information, the second BIER information, and the host routing prefix, where in the BIER forwarding entry, the first network device is a next-hop BFR neighbor of the second network device.

Optionally, the host routing prefix includes a first internet protocol (IP) address, and the first IP address is an IP address of the first network device.

The construction module 1620 may be specifically configured to construct a BIFT entry based on the BFR ID of the at least one BFR in the first area, the first IP address, and the BIFT ID of the first network device, where the BIFT entry includes the at least one BFR ID, information that is about a next-hop BFR neighbor and that corresponds to the at least one BFR ID, and encapsulation information of the BFR neighbor, the information about the next-hop BFR neighbor includes the first IP address, and the encapsulation information includes the BIFT ID of the first network device.

Optionally, the first message is an interior gateway protocol (IGP) message.

Optionally, the IGP message is an intermediate system to intermediate system (IS-IS) protocol message or an open shortest path first (OSPF) protocol message.

Optionally, that the first area and the second area are different includes:
 the first area is an area that runs a first IS-IS level, the second area is an area that runs a second IS-IS level, and the first IS-IS level and the second IS-IS level are different; or
 the first area is a first OSPF area, the second area is a second OSPF area, and the first OSPF area and the second OSPF area are different; or
 the first area is an area that runs OSPF or BGP, and the second area is an area that runs IS-IS; or
 the first area is an area that runs IS-IS or BGP, and the second area is an area that runs OSPF; or
 the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or
 the first area is a first OSPF area for which a first OSPF process is run on the first network device, the second area is the first OSPF area for which a second OSPF process is run on the first network device, and the first OSPF process and the second OSPF process are different.

Optionally, the first network device is a non-directly connected BFR neighbor of the second network device, and the apparatus further includes a determining module 1630, configured to determine a unicast tunnel corresponding to the first IP address, where the BIFT entry includes encapsulation information corresponding to the unicast tunnel.

Optionally, the unicast tunnel is a multiprotocol label switching (MPLS) tunnel, and the BIFT entry includes encapsulation information corresponding to the MPLS tunnel.

Optionally, the unicast tunnel is an internet protocol (IP) tunnel, and the encapsulation information includes the first IP address.

Optionally, the second BIER information further includes a first indication, and the first indication is used to indicate that the second BIER information is BIER information that is of the at least one BFR and that is imported from the first area into the second area.

Figure 17:
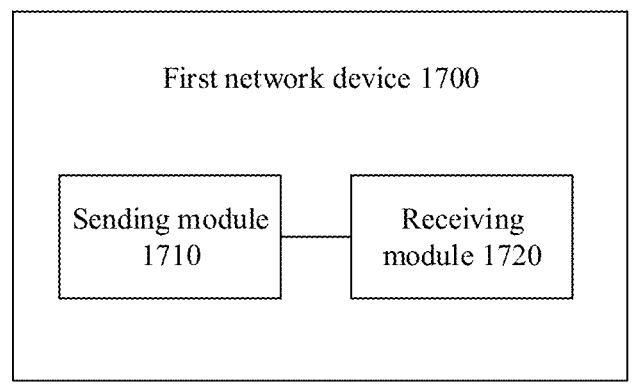
FIG. 17 is a schematic diagram of a structure of a first network device 1700 according to an embodiment of this application.

FIG. 17 is a schematic diagram of a structure of a first network device 1700 according to an embodiment of this application. The first network device 1700 may include:
 a sending module 1710, configured to send a first message to a second network device, where the first message is used to direct the second network device to construct a bit index explicit replication (BIER) forwarding entry, the first message includes a host routing prefix of the first network device, first BIER information, and second BIER information, the first BIER information includes a bit index forwarding table identifier (BIFT ID) of the first network device, the second BIER information includes a bit-forwarding router identifier (BFR ID) of at least one bit-forwarding router (BFR) in a first area, the at least one BFR does not include the first network device, the first network device belongs to the first area and a second area, the second network device belongs to the second area, and the first area and the second area are different; and a receiving module 1720, configured to receive a BIER packet sent by the second network device.

Optionally, the host routing prefix includes a first internet protocol (IP) address, the first IP address is an IP address of the first network device, the BIER forwarding entry includes the at least one BFR ID, information that is about a next-hop BFR neighbor and that corresponds to the at least one BFR ID, and encapsulation information of the BFR neighbor, the information about the next-hop BFR neighbor includes the first IP address, and the encapsulation information includes the BIFT ID of the first network device.

Optionally, the first message is an interior gateway protocol (IGP) message.

Optionally, the IGP message is an intermediate system to intermediate system (IS-IS) protocol message or an open shortest path first (OSPF) protocol message.

Optionally, that the first area and the second area are different includes:

the first area is an area that runs a first IS-IS level, the second area is an area that runs a second IS-IS level, and the first IS-IS level and the second IS-IS level are different; or the first area is a first OSPF area, the second area is a second OSPF area, and the first OSPF area and the second OSPF area are different; or the first area is an area that runs OSPF or BGP, and the second area is an area that runs IS-IS; or the first area is an area that runs IS-IS or BGP, and the second area is an area that runs OSPF; or the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or the first area is a first OSPF area for which a first OSPF process is run on the first network device, the second area is the first OSPF area for which a second OSPF process is run on the first network device, and the first OSPF process and the second OSPF process are different.

Optionally, an IP address with the host routing prefix does not overlap with an IP address with another routing prefix of the first network device.

Optionally, the first network device is a non-directly connected BFR neighbor of the second network device. The BIER forwarding entry further includes encapsulation information corresponding to a unicast tunnel, and the unicast tunnel is a unicast tunnel corresponding to the first IP address.

Optionally, the unicast tunnel is a multiprotocol label switching (MPLS) tunnel, and the BIER forwarding entry includes encapsulation information corresponding to the MPLS tunnel.

Optionally, the unicast tunnel is an internet protocol (IP) tunnel, and the BIER forwarding entry includes the first IP address.

Optionally, the second BIER information further includes a first indication, and the first indication is used to indicate that the second BIER information is BIER information that is of the at least one BFR and that is imported from the first area into the second area.

Figure 18:
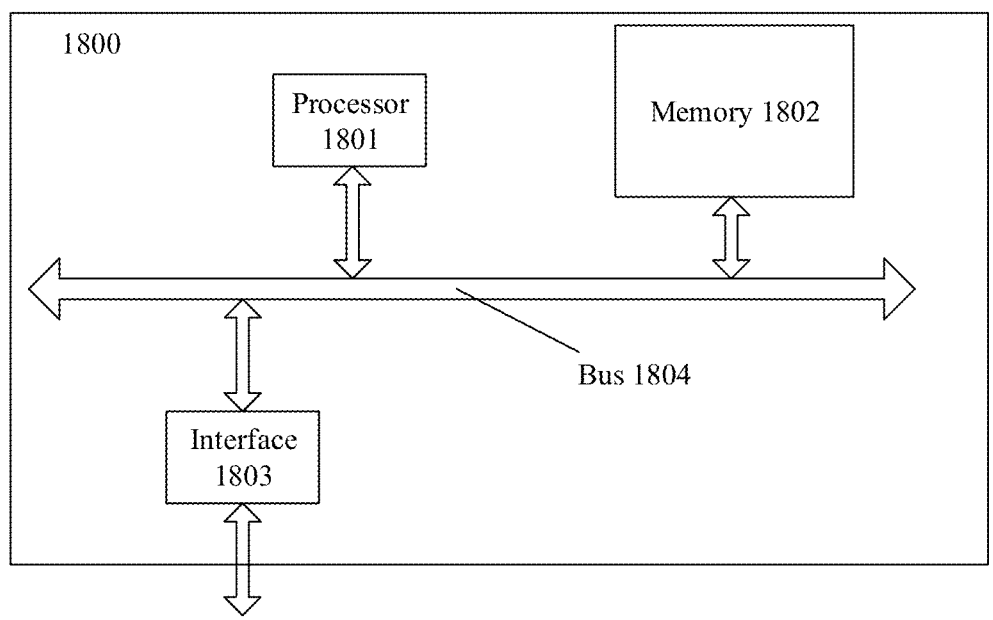
FIG. 18 is a schematic diagram of a hardware structure of a second network device 1800 according to an embodiment of this application.

FIG. 18 is a schematic diagram of a hardware structure of a second network device 1800 according to an embodiment of this application. The second network device 1800 shown in FIG. 18 may perform corresponding steps performed by the second network device in the methods in the foregoing embodiments, and have a function of the second network device.

As shown in FIG. 18, the second network device 1800 includes a processor 1801, a memory 1802, an interface 1803, and a bus 1804. The interface 1803 may be implemented in a wireless or wired manner, and may be specifically a network interface card. The processor 1801, the memory 1802, and the interface 1803 are connected by using the bus 1804.

The interface 1803 may specifically include a transmitter and a receiver, which are used by the second network device to exchange a message and forward a BIER packet with the first network device in the foregoing embodiment. For example, the interface 1803 is configured to support the second network device in receiving a first message sent by a first network device in a first area, or is further configured to support the second network device in sending a BIER packet from the second network device to the first network device based on a BIFT entry. For example, the interface 1803 is configured to support step 610 and step 630 in FIG. 6. The processor 1801 is configured to perform processing performed by the second network device in the foregoing embodiments. For example, the processor 1801 is configured to construct a BIFT entry based on first BIER information, second BIER information, and a host routing prefix; and/or configured to perform another process in the technology described in this specification. The memory 1802 may further include an operating system and an application program, and is configured to store a program, code, or instructions. When the processor executes the program, code, or instructions, a processing process related to the second network device in the method embodiments can be completed. Optionally, the memory 1802 may include a read-only memory (ROM) and a random access memory (RAM). The ROM includes a basic input/output system (BIOS) or an embedded system, and the RAM includes an application program and an operating system. When the second network device 1800 needs to run, a bootloader in the BIOS or the embedded system that is built into the ROM is used to boot a system to start, and boot the second network device 1800 to enter a normal running state. After entering the normal running state, the second network device 1800 runs the application program and the operating system in the RAM, to complete the processing process related to the second network device 1800 in the method embodiment.

It may be understood that FIG. 18 merely shows a simplified design of the second network device 1800. In an actual application, the first network device may include any quantity of interfaces, processors, or memories.

Figure 19:
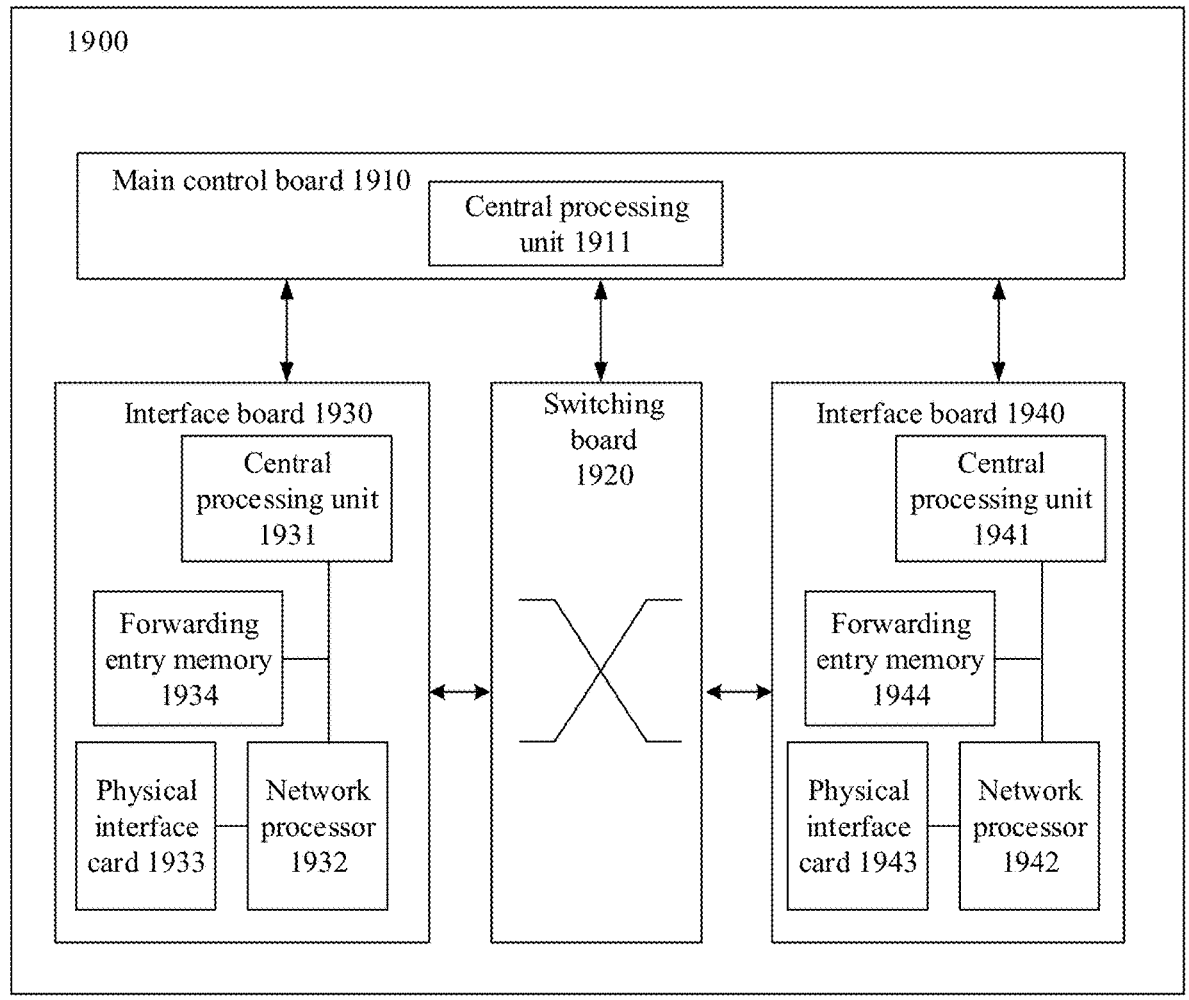
FIG. 19 is a schematic diagram of a hardware structure of another second network device 1900 according to an embodiment of this application.

FIG. 19 is a schematic diagram of a hardware structure of another second network device 1900 according to an embodiment of this application. The second network device 1900 shown in FIG. 19 may perform corresponding steps performed by the second network device in the methods in the foregoing embodiments.

As shown in FIG. 19, the second network device 1900 includes a main control board 1910, an interface board 1930, a switching board 1920, and an interface board 1940. The main control board 1910, the interface boards 1930 and 1940, and the switching board 1920 are connected to each other by connecting to a backplane by using a bus. The main control board 1910 is configured to complete functions such as system management, device maintenance, and protocol processing. The switching board 1920 is configured to exchange data between interface boards (the interface board is also referred to as a line card or a service board). The interface boards 1930 and 1940 are configured to provide various service interfaces (for example, a POS interface, a GE interface, and an ATM interface), and forward a data packet.

The interface board 1930 may include a central processing unit 1931, a forwarding entry memory 1934, a physical interface card 1933, and a network processor 1932. The central processing unit 1931 is configured to control and manage the interface boards. The forwarding entry memory 1934 is configured to store an entry, for example, the foregoing BIFT entry. The physical interface card 1933 is configured to receive and send a message or a BIER packet. The network processor 1932 is configured to control, based on the entry, the physical interface card 1933 to send and receive the message or the BIER packet.

Specifically, the physical interface card 1933 is configured to receive a first message sent by a first network device in a first area. After receiving the first message, the physical interface card 1933 sends the first message to a central processing unit 1911 through the central processing unit 1931, and the central processing unit 1911 processes the first message.

The central processing unit 1911 is further configured to construct a BIFT entry based on first BIER information, second BIER information, and a host routing prefix, and store the BIFT entry in the forwarding entry memory 1934.

The central processing unit 1911 is further configured to control the network processor 1932 to obtain the BIFT entry in the forwarding entry memory 1934. In addition, the central processing unit 1931 is further configured to control the network processor 1932 to send the BIFT entry to the first network device through the physical interface card 1933. The central processing unit 1931 is further configured to control the network processor 1932 to send a BIER packet to the first network device through the physical interface card 1933.

It should be understood that an operation on the interface board 1940 is consistent with an operation on the interface board 1930 in this embodiment of this application. For brevity, details are not described. It should be understood that the second network device 1900 in this embodiment may correspond to the functions and/or the various implemented steps in the foregoing method embodiment. Details are not described herein again.

In addition, it should be noted that there may be one or more main control boards. When there are a plurality of main control boards, an active main control board and a standby main control board may be included. There may be one or more interface boards, and a first network device having a stronger data processing capability provides more interface boards. There may also be one or more physical interface cards on the interface board. There may be no switching board or one or more switching boards. When there are a plurality of switching boards, load sharing and redundancy backup may be implemented by the switching boards together. In a centralized forwarding architecture, a first network device may not need a switching board, and an interface board provides a function of processing service data of an entire system. In a distributed forwarding architecture, a first network device may have at least one switching board, and data exchange between a plurality of interface boards is implemented by using the switching board, to provide a large-capacity data exchange and processing capability. Therefore, a data access and processing capability of the first network device in the distributed architecture is better than that of a device in the centralized architecture. A specific architecture that is to be used depends on a specific networking deployment scenario. This is not limited herein.

Figure 20:
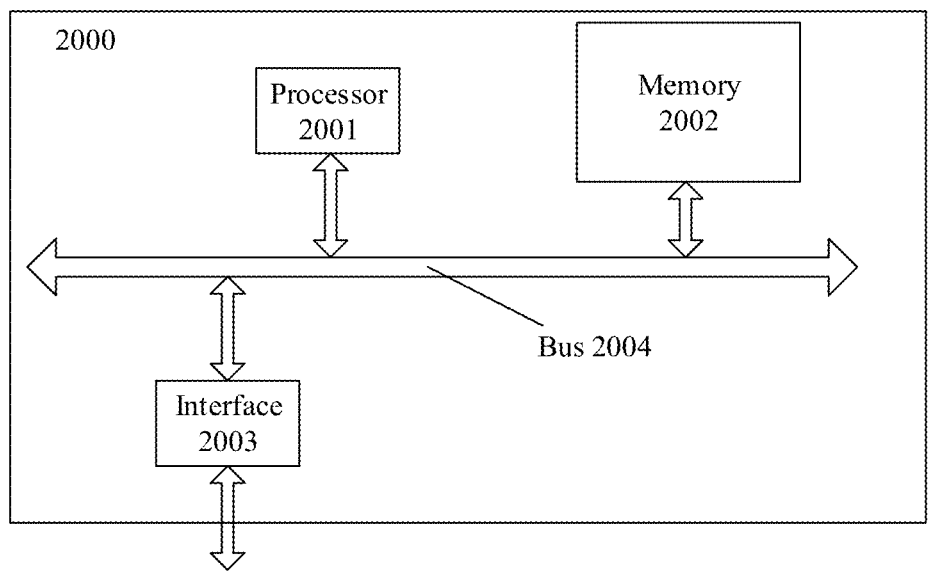
FIG. 20 is a schematic diagram of a hardware structure of a first network device 2000 according to an embodiment of this application.

FIG. 20 is a schematic diagram of a hardware structure of a first network device 2000 according to an embodiment of this application. The first network device 2000 shown in FIG. 20 may perform corresponding steps performed by the first network device in the methods in the foregoing embodiments, and have a function of the first network device.

As shown in FIG. 20, the first network device 2000 includes a processor 2001, a memory 2002, an interface 2003, and a bus 2004. The interface 2003 may be implemented in a wireless or wired manner, and may be specifically a network interface card. The processor 2001, the memory 2002, and the interface 2003 are connected by using the bus 2004.

The interface 2003 may specifically include a transmitter and a receiver, which are used by the first network device to exchange a message and forward a BIER packet with the second network device in the foregoing embodiment. For example, the interface 2003 is configured to support receiving of a BIER packet sent by the second network device. The processor 2001 is configured to perform processing performed by the first network device in the foregoing embodiments. For example, the processor 2001 is configured to send a received BIER packet to a BFER based on a BIFT entry, and/or configured to perform another process in the technology described in this specification. The memory 2002 may further include an operating system and an application program, and is configured to store a program, code, or instructions. When the processor executes the program, the code, or the instructions, a processing process of the first network device in the foregoing method embodiments can be completed. Optionally, the memory 2002 may include a read-only memory (ROM) and a random access memory (RAM). The ROM includes a basic input/output system (BIOS) or an embedded system, and the RAM includes an application program and an operating system. When the first network device 2000 needs to run, a bootloader in the BIOS or the embedded system that is built into the ROM is used to boot a system to start, and boot the first network device 2000 to enter a normal running state. After entering the normal running state, the first network device 2000 runs the application program and the operating system in the RAM, to complete the processing process related to the first network device 2000 in the method embodiment.

It may be understood that FIG. 20 merely shows a simplified design of the first network device 2000. In an actual application, the first network device may include any quantity of interfaces, processors, or memories.

Figure 21:
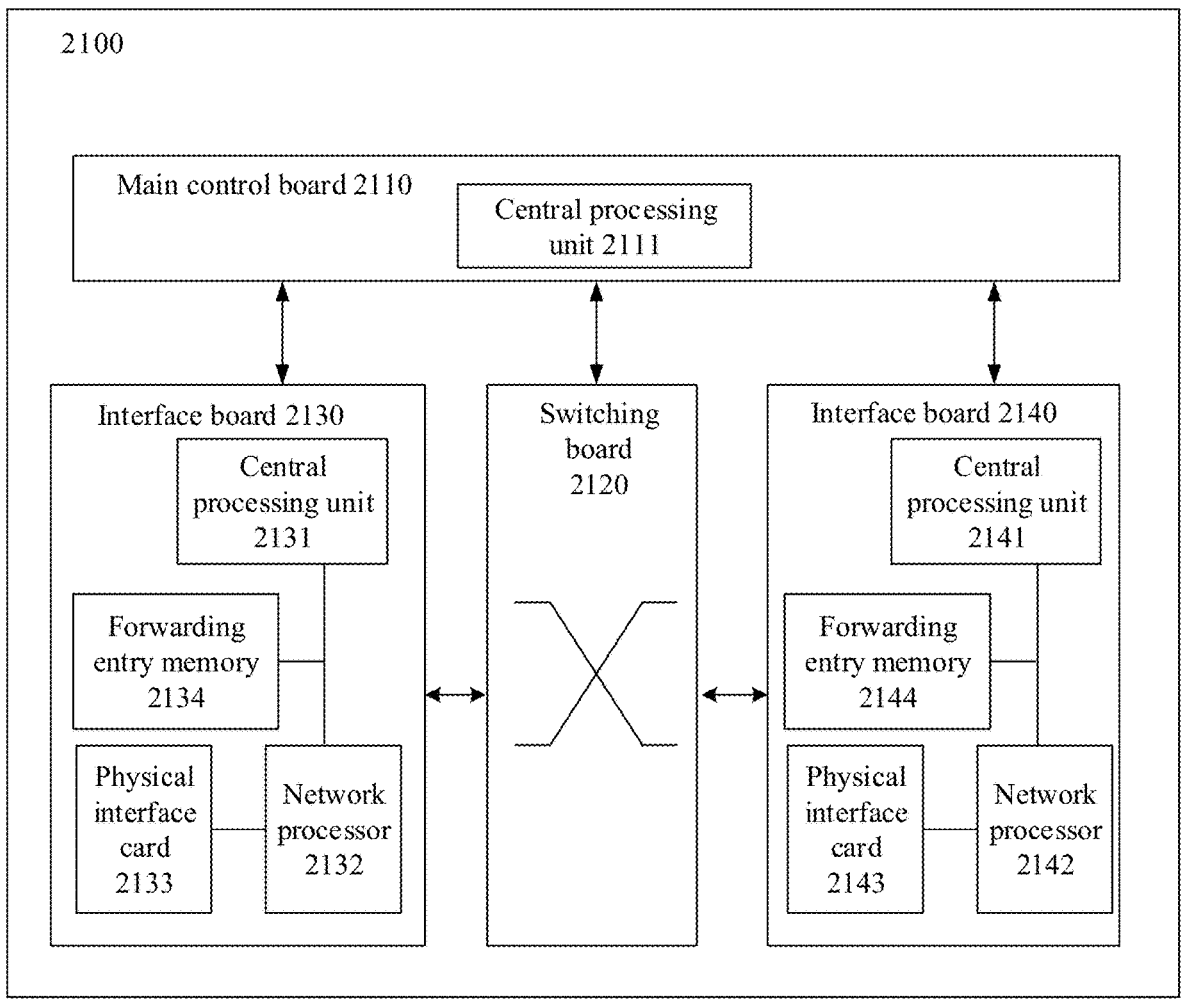
FIG. 21 is a schematic diagram of a hardware structure of another first network device 2100 according to an embodiment of this application.

FIG. 21 is a schematic diagram of a hardware structure of another first network device 2100 according to an embodiment of this application. The first network device 2100 shown in FIG. 21 may perform the corresponding steps performed by the first network device in the methods in the foregoing embodiments.

As shown in FIG. 21, the first network device 2100 includes a main control board 2110, an interface board 2130, a switching board 2120, and an interface board 2140. The main control board 2110, the interface boards 2130 and 2140, and the switching board 2120 are connected to each other by connecting to a backplane by using a bus. The main control board 2110 is configured to complete functions such as system management, device maintenance, and protocol processing. The switching board 2120 is configured to exchange data between interface boards (the interface board is also referred to as a line card or a service board). The interface boards 2130 and 2140 are configured to provide various service interfaces (for example, a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to control and manage the interface boards. The forwarding entry memory 2134 is configured to store an entry, for example, a BIFT entry. The physical interface card 2133 is configured to receive and send a message or a BIER packet. The network processor 2132 is configured to control, based on the entry, the physical interface card 2133 to send and receive the message or the BIER packet.

Specifically, the physical interface card 2133 is configured to receive a BIER packet sent by a second network device. After receiving the BIER packet, the physical interface card 2133 sends the BIER packet to a central processing unit 2111 through the central processing unit 2131, and the central processing unit 2111 processes the BIER packet.

The central processing unit 2111 is further configured to control the network processor 2132 to obtain the BIFT entry in the forwarding entry memory 2134. In addition, the central processing unit 2131 is further configured to control the network processor 2132 to send the BIER packet to a BFER through the physical interface card 2133.

It should be understood that an operation on the interface board 2140 is consistent with an operation on the interface board 2130 in this embodiment of this application. For brevity, details are not described. It should be understood that the first network device 2100 in this embodiment may correspond to the functions and/or the various implemented steps in the foregoing method embodiment. Details are not described herein.

In addition, it should be noted that there may be one or more main control boards. When there are a plurality of main control boards, an active main control board and a standby main control board may be included. There may be one or more interface boards, and a first network device having a stronger data processing capability provides more interface boards. There may also be one or more physical interface cards on the interface board. There may be no switching board or one or more switching boards. When there are a plurality of switching boards, load sharing and redundancy backup may be implemented by the switching boards together. In a centralized forwarding architecture, a first network device may not need a switching board, and an interface board provides a function of processing service data of an entire system. In a distributed forwarding architecture, a first network device may have at least one switching board, and data exchange between a plurality of interface boards is implemented by using the switching board, to provide a large-capacity data exchange and processing capability. Therefore, a data access and processing capability of the first network device in the distributed architecture is better than that of a device in the centralized architecture. A specific architecture that is to be used depends on a specific networking deployment scenario. This is not limited herein.

Figure 22:
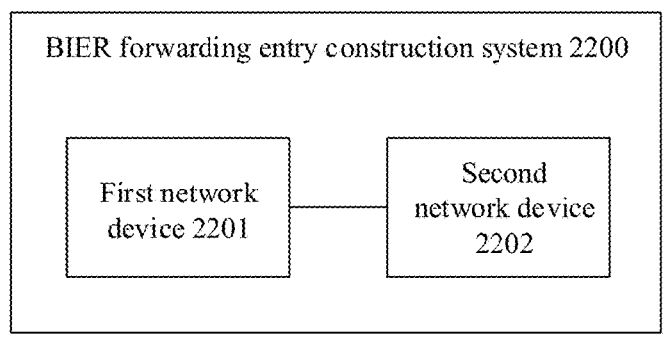
FIG. 22 is a schematic diagram of a structure of a BIER forwarding entry construction system 2200 according to an embodiment of this application.

FIG. 22 is a schematic diagram of a structure of a BIER forwarding entry construction system 2200 according to an embodiment of this application. As shown in FIG. 22, the BIER forwarding entry construction system 2200 may include a first network device 2201 and a second network device 2202.

The second network device 2202 may perform the following operation: receiving a first message sent by the first network device 2201, where the first message includes a host routing prefix of the first network device 2201, first BIER information, and second BIER information. The second network device 2202 may construct a BIER forwarding entry based on the first BIER information, the second BIER information, and the host routing prefix. In the BIER forwarding entry, the first network device 2201 is a next-hop BFR neighbor of the second network device 2202.

It should be understood that in this application, the first BIER information includes a bit index forwarding table identifier (BIFT ID) of the first network device 2201, and the second BIER information includes a BFR ID of at least one bit-forwarding router (BFR) in a first area. The at least one BFR does not include the first network device 2201. The first network device 2201 belongs to the first area and a second area, and the second network device 2202 belongs to the second area. The first area and the second area are different.

The second network device 2202 may perform corresponding steps performed by the second network device in the methods in the foregoing embodiments, and have a function of the second network device. For example, the second network device 2202 may perform the method steps described in step 610 and step 620 in FIG. 6, or may perform corresponding steps performed by the second network device in FIG. 8, FIG. 13, FIG. 14, and FIG. 15.

The first network device 2201 may perform the following operation: sending the first message to the second network device 2202, where the first message is used to direct the second network device 2202 to construct a bit index explicit replication (BIER) forwarding entry. The first network device 2201 may further receive a BIER packet sent by the second network device 2202.

The first network device 2201 may perform corresponding steps performed by the first network device in the methods in the foregoing embodiments, and have a function of the first network device. For example, the first network device 2201 may perform corresponding steps performed by the first network device in FIG. 8, FIG. 13, FIG. 14, and FIG. 15.

An embodiment of this application further provides a computer-readable medium, configured to store a computer program. The computer program includes instructions used to perform the method in any possible implementation of any one of the foregoing aspects. The readable medium may be a read-only memory (ROM) or a random access memory (RAM). This is not limited in this embodiment of this application.

An embodiment of this application further provides a computer program product, used in a first network device or a second network device. The computer program product includes computer program code. When the computer program code is executed by a computer, the computer is enabled to perform the method in any possible implementation of any one of the foregoing aspects.

An embodiment of this application further provides a chip system. The chip system is used in a first network device or a second network device. The chip system includes at least one processor, at least one memory, and an interface circuit. The interface circuit is responsible for exchanging information between the chip system and the outside. The at least one memory, the interface circuit, and the at least one processor are interconnected by using a line, and the at least one memory stores instructions. The instructions are executed by the at least one processor, to perform operations of the first network device or the second network device in the methods according to the foregoing aspects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A bit index explicit replication (BIER) forwarding entry construction method, comprising:
   receiving, by a second network device, a first message sent by a first network device, wherein the first message comprises a host routing prefix of the first network device, first BIER information, and second BIER information, the first BIER information comprises a bit index forwarding table identifier (BIFT ID) of the first network device, the second BIER information comprises a bit-forwarding router (BFR) ID of at least one BFR in a first area, the at least one BFR does not comprise the first network device, the first network device belongs to the first area and a second area, the second network device belongs to the second area, and the first area and the second area are different; and
   constructing, by the second network device, a BIER forwarding entry based on the first BIER information, the second BIER information, and the host routing prefix, wherein in the BIER forwarding entry, the first network device is a next-hop BFR neighbor of the second network device.

2. The method according to claim 1, wherein the host routing prefix comprises a first internet protocol (IP) address, and the first IP address is an IP address of the first network device; and
   the constructing, by the second network device, a BIER forwarding entry based on the first BIER information, the second BIER information, and the host routing prefix comprises:
   constructing, by the second network device, a BIFT entry based on the BFR ID of the at least one BFR, the first IP address, and the BIFT ID of the first network device, wherein the BIFT entry comprises the BRF ID of the at least one BFR, information about a next-hop BFR neighbor corresponding to the BFR ID of the at least one BFR, and encapsulation information of the BFR neighbor, the information about the next-hop BFR neighbor comprises the first IP address, and the encapsulation information comprises the BIFT ID of the first network device.

3. The method according to claim 2, wherein the first network device is a non-directly connected BFR neighbor of the second network device, and the method further comprises:
  determining, by the second network device, a unicast tunnel corresponding to the first IP address, wherein the BIFT entry comprises encapsulation information corresponding to the unicast tunnel.

4. The method according to claim 1, wherein the first message is an interior gateway protocol (IGP) message.

5. The method according to claim 4, wherein the IGP message is an intermediate system to intermediate system (IS-IS) protocol message or an open shortest path first (OSPF) protocol message.

6. The method according to claim 1, wherein
  the first area is an area that runs a first IS-IS level, the second area is an area that runs a second IS-IS level, and the first IS-IS level and the second IS-IS level are different; or
  the first area is a first OSPF area, the second area is a second OSPF area, and the first OSPF area and the second OSPF area are different; or
  the first area is an area that runs OSPF or BGP, and the second area is an area that runs IS-IS; or
  the first area is an area that runs IS-IS or BGP, and the second area is an area that runs OSPF; or
  the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or
  the first area is a first OSPF area for which a first OSPF process is run on the first network device, the second area is the first OSPF area for which a second OSPF process is run on the first network device, and the first OSPF process and the second OSPF process are different.

7. A bit index explicit replication (BIER) forwarding entry construction method, comprising:
  sending, by a first network device, a first message to a second network device, wherein the first message is used to direct the second network device to construct a BIER forwarding entry, the first message comprises a host routing prefix of the first network device, first BIER information, and second BIER information, the first BIER information comprises a bit index forwarding table identifier (BIFT ID) of the first network device, the second BIER information comprises a bit-forward router (BFR) ID of at least one BFR in a first area, the at least one BFR does not comprise the first network device, the first network device belongs to the first area and a second area, the second network device belongs to the second area, and the first area and the second area are different.

8. The method according to claim 7, wherein the host routing prefix comprises a first internet protocol (IP) address, wherein the first IP address is an IP address of the first network device, wherein the BIER forwarding entry comprises the BFR ID of the at least one BFR, information about a next-hop BFR neighbor corresponding to the BFR ID of the at least one BFR, and encapsulation information of the BFR neighbor, wherein the information about the next-hop BFR neighbor comprises the first IP address, and wherein the encapsulation information comprises the BIFT ID of the first network device.

9. The method according to claim 7, wherein the first message is an interior gateway protocol (IGP) message.

10. The method according to claim 9, wherein the IGP message is an intermediate system to intermediate system (IS-IS) protocol message or an open shortest path first (OSPF) protocol message.

11. The method according to claim 7, wherein
  the first area is an area that runs a first IS-IS level, the second area is an area that runs a second IS-IS level, and the first IS-IS level and the second IS-IS level are different; or
  the first area is a first OSPF area, the second area is a second OSPF area, and the first OSPF area and the second OSPF area are different; or
  the first area is an area that runs OSPF or BGP, and the second area is an area that runs IS-IS; or
  the first area is an area that runs IS-IS or BGP, and the second area is an area that runs OSPF; or
  the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or
  the first area is a first OSPF area for which a first OSPF process is run on the first network device, the second area is the first OSPF area for which a second OSPF process is run on the first network device, and the first OSPF process and the second OSPF process are different.

12. A bit index explicit replication (BIER) forwarding entry construction apparatus, comprising a processor and a memory, wherein the memory is configured to store a program, and the processor is configured to invoke the program to cause the apparatus to:
  receive a first message sent by a first network device, wherein the first message comprises a host routing prefix of the first network device, first BIER information, and second BIER information, the first BIER information comprises a bit index forwarding table identifier (BIFT ID) of the first network device, the second BIER information comprises a bit-forward router (BFR) ID of at least one BFR in a first area, the at least one BFR does not comprise the first network device, the first network device belongs to the first area and a second area, a second network device belongs to the second area, and the first area and the second area are different; and
  construct a BIER forwarding entry based on the first BIER information, the second BIER information, and the host routing prefix, wherein in the BIER forwarding entry, the first network device is a next-hop BFR neighbor of the second network device.

13. The apparatus according to claim 12, wherein the host routing prefix comprises a first internet protocol (IP) address, and the first IP address is an IP address of the first network device; and wherein the apparatus is further caused to construct a BIFT entry based on the BFR ID of the at least one BFR in the first area, the first IP address, and the BIFT ID of the first network device, wherein the BIFT entry comprises the BFR ID of the at least one BFR, information about a next-hop BFR neighbor corresponding to the BFR ID of the at least one BFR, and encapsulation information of the BFR neighbor, wherein the information about the next-hop BFR neighbor comprises the first IP address, and wherein the encapsulation information comprises the BIFT ID of the first network device.

14. The apparatus according to claim 12, wherein the first message is an interior gateway protocol (IGP) message.

15. The apparatus according to claim 14, wherein the IGP message is an intermediate system to intermediate system (IS-IS) protocol message or an open shortest path first (OSPF) protocol message.

16. The apparatus according to claim 12, wherein
the first area is an area that runs a first IS-IS level, the second area is an area that runs a second IS-IS level, and the first IS-IS level and the second IS-IS level are different; or
the first area is a first OSPF area, the second area is a second OSPF area, and the first OSPF area and the second OSPF area are different; or
the first area is an area that runs OSPF or BGP, and the second area is an area that runs IS-IS; or
the first area is an area that runs IS-IS or BGP, and the second area is an area that runs OSPF; or
the first area is an area that runs a first IS-IS level and for which a first IS-IS process is run on the first network device, the second area is an area that runs the first IS-IS level and for which a second IS-IS process is run on the first network device, and the first IS-IS process and the second IS-IS process are different; or
the first area is a first OSPF area for which a first OSPF process is run on the first network device, the second area is the first OSPF area for which a second OSPF process is run on the first network device, and the first OSPF process and the second OSPF process are different.

17. A bit index explicit replication (BIER) forwarding entry construction apparatus, comprising a processor and a memory, wherein the memory is configured to store a program, and the processor is configured to invoke the program to cause the apparatus to:
send a first message to a second network device, wherein the first message is used to direct the second network device to construct a BIER forwarding entry, the first message comprises a host routing prefix of a first network device, first BIER information, and second BIER information, the first BIER information comprises a bit index forwarding table identifier (BIFT ID) of the first network device, the second BIER information comprises a bit-forward router (BFR) ID of at least one BFR in a first area, the at least one BFR does not comprise the first network device, the first network device belongs to the first area and a second area, the second network device belongs to the second area, and the first area and the second area are different.

18. The apparatus according to claim 17, wherein the host routing prefix comprises a first internet protocol (IP) address, the first IP address is an IP address of the first network device, the BIER forwarding entry comprises the BFR ID of the at least one BFR, information about a next-hop BFR neighbor corresponding to the BFR ID of the at least one BFR, and encapsulation information of the BFR neighbor, wherein the information about the next-hop BFR neighbor comprises the first IP address, and wherein the encapsulation information comprises the BIFT ID of the first network device.

19. The apparatus according to claim 17, wherein the first message is an interior gateway protocol (IGP) message.

20. The apparatus according to claim 19, wherein the IGP message is an intermediate system to intermediate system (IS-IS) protocol message or an open shortest path first (OSPF) protocol message.

* * * * *

UNITED STATES PATENT AND TRADEMARK OFFICE
CERTIFICATE OF CORRECTION

| | |
|---|---|
| PATENT NO. | : 11,848,858 B2 |
| APPLICATION NO. | : 17/708233 |
| DATED | : December 19, 2023 |
| INVENTOR(S) | : Jingrong Xie et al. |

It is certified that error appears in the above-identified patent and that said Letters Patent is hereby corrected as shown below:

On the Title Page

Item (56), in Column 2, under "Other Publications", Line 1, delete "K." and insert -- X. --.

Signed and Sealed this
Eleventh Day of June, 2024

Katherine Kelly Vidal
*Director of the United States Patent and Trademark Office*